US008331731B2

(12) United States Patent
Kashibuchi

(10) Patent No.: US 8,331,731 B2
(45) Date of Patent: Dec. 11, 2012

(54) IMAGE PROCESSING METHOD AND IMAGE PROCESSING APPARATUS

(75) Inventor: Yoichi Kashibuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 12/052,664

(22) Filed: Mar. 20, 2008

(65) Prior Publication Data

US 2008/0310758 A1 Dec. 18, 2008

(30) Foreign Application Priority Data

Mar. 27, 2007 (JP) .................................. 2007-082740

(51) Int. Cl.
*G06K 9/32* (2006.01)

(52) U.S. Cl. ......... 382/299; 347/112; 348/625; 358/1.2; 358/1.9; 358/3.07; 358/426.01; 358/426.11; 382/173; 382/232; 382/240; 382/305

(58) Field of Classification Search ........................ None
See application file for complete search history.

(56) References Cited

U.S. PATENT DOCUMENTS

| 4,366,506 | A | * | 12/1982 | Ejiri et al. ................. 358/426.01 |
| 4,414,580 | A | * | 11/1983 | Johnsen et al. ........... 358/426.11 |
| 4,437,122 | A | * | 3/1984 | Walsh et al. ................... 348/625 |
| 4,827,352 | A | * | 5/1989 | Yoneda et al. ................ 358/3.07 |
| 4,873,577 | A | * | 10/1989 | Chamzas ....................... 382/240 |
| 4,979,049 | A | * | 12/1990 | Chamzas et al. ......... 358/426.11 |
| 5,031,053 | A | * | 7/1991 | Chamzas et al. ......... 358/426.11 |
| 5,060,082 | A | * | 10/1991 | Matsumoto et al. .......... 358/447 |
| 5,430,555 | A | * | 7/1995 | Sawada et al. ................. 382/232 |
| 5,526,468 | A | * | 6/1996 | Kolb et al. ....................... 358/1.2 |
| 5,917,952 | A | * | 6/1999 | Noh .............................. 358/3.07 |
| 5,920,646 | A | * | 7/1999 | Kamon .......................... 382/173 |
| 5,956,470 | A | * | 9/1999 | Eschbach ........................ 358/1.9 |
| 6,020,979 | A | * | 2/2000 | Zeck et al. ....................... 358/1.9 |
| 6,289,137 | B1 | * | 9/2001 | Sugiyama et al. ............ 382/299 |
| 7,545,992 | B2 |   | 6/2009 | Kato et al. |
| 2002/0067404 | A1 | * | 6/2002 | Loce ............................. 347/112 |
| 2003/0072500 | A1 | * | 4/2003 | Sugegaya et al. ............. 382/305 |
| 2004/0141613 | A1 | * | 7/2004 | Hayashi .......................... 380/28 |
| 2006/0215186 | A1 | * | 9/2006 | Ernst et al. ...................... 358/1.2 |

FOREIGN PATENT DOCUMENTS

CN 1719862 1/2006

(Continued)

OTHER PUBLICATIONS

Chinese Office Action dated Oct. 9, 2009 in Counterpart Application No. 2008100848250.

*Primary Examiner* — Tsung-Yin Tsai

(74) *Attorney, Agent, or Firm* — Fitzpatrick, Cella, Harper & Scinto

(57) ABSTRACT

When a multi-level image having a first resolution is converted into a multi-level image having a second resolution lower than the first resolution, attribute data including a conversion processed flag indicating a kind of conversion and a conversion result is generated and held associated with pixel data of a pixel on interest undergone the conversion corresponding to an attribute flag indicating an attribute in which a pixel before the conversion is located. When the multi-level image having the first resolution is restored from the multi-level image having the second resolution, the pixel data of the pixel of interest is replaced with pixel data of a plurality of pixels in correspondence with the conversion processed flag in the attribute data held associated with the pixel data of the pixel on interest and pixel data of pixels around the pixel of interest.

23 Claims, 35 Drawing Sheets

FOREIGN PATENT DOCUMENTS

| | | |
|---|---|---|
| JP | 4-307270 | 10/1992 |
| JP | 4-336859 | 11/1992 |
| JP | 2000151991 A * | 5/2000 |
| JP | 2001119574 A * | 4/2001 |
| JP | 2001189858 A * | 7/2001 |

* cited by examiner

FIG. 3A

|   | 0 | 1 |
|---|---|---|
| 0 | 0.25 | 0.25 |
| 1 | 0.25 | 0.25 |

FIG. 3B

|   | 0 | 1 | 2 |
|---|---|---|---|
| 0 | 0.1 | 0.1 | 0.1 |
| 1 | 0.1 | 0.2 | 0.1 |
| 2 | 0.1 | 0.1 | 0.1 |

F I G. 15

113c, 113d

| INDEX | 0 | 1 | 2 | 3 | 4 |
|---|---|---|---|---|---|
| MATCHING-PATTERN | 1001 | 1101 | 1201 | 1301 | 1401 |
| PIXEL REPLACING PATTERN | 1002 | 1102 | 1202 | 1302 | 1402 |

FIG. 34

|   | 0 | 1 |
|---|---|---|
| 0 | 1 | 3 |
| 1 | 0 | 2 |

IMAGE PROCESSING METHOD AND IMAGE PROCESSING APPARATUS

BACKGROUND OF THE INVENTION

1. Field of the Invention

The present invention relates to an image processing method and an image processing apparatus, more particularly, to resolution conversion processing for restoring image data before pseudo high-resolution conversion processing with high precision based on image data converted into low-resolution and generated attribute data through the pseudo high-resolution conversion processing.

2. Description of the Related Art

Recent printers have gained remarkably high image quality, and had high-resolution engines, high-speed processors and large-capacity memories. However, since immense cost is required to prepare all these units, some methods have been proposed to grant both requirements of high image quality and high-speed, and lower cost.

For example, as a method which has been adopted in conventional electrophotographic printers, a method of exposing pixels on a photosensitive member so as to overlap each other at intermediate portion of their dot pitches using low-resolution image data, while the resolution of the engine maintains the low-resolution, is known. With this method, a latent image is formed so that an overlap portion of pixels also becomes an effective pixel. This method is called as a spot-multiplexing method in which an image is reproduced at a pseudo higher resolution than an actual resolution (for example, see JPA 4-336859).

However, in the method based on such spot-multiplexing, image forming is not stable and is difficult to be controlled when compared to the normal process. Also, the following problems are posed: the boundary between a background and object may become unclear in a character or line image, a character may be defaced, a jazzy may be generated, and so forth. In order to solve these problems, the following method has been proposed (for example, JPA 4-307270). In this method, for example, an received image of vector data is rendered to an image of raster data with a resolution lower than the resolution of the engine, the image of the raster data is converted in its resolution so as to finally match the resolution of the engine, and the converted image is output to the engine. As a result, a low-resolution is maintained in a controller, and an image is reproduced at a pseudo high resolution when it is output.

In a printer using the principle of JPA 4-336859, an image processor in the printer applies filter processing to convert a high-resolution image into a low-resolution image, and reproduces a pseudo high-resolution image from the low-resolution image using the spot-multiplexing method.

In this way, with the conventional technique using the spot-multiplexing method (for example, JPA 4-336859) and its improved technique, since a low-resolution image can be reproduced as a pseudo high-resolution image, for example, the memory size of an image storage area can be reduced. However, since a latent image is formed by overlapping two neighboring exposed portions so as to reproduce one dot, a formed image often becomes unstable and it is difficult to reproduce small fonts and thin lines and thus control the reproducing of the image.

In the above related art (for example, JPA 4-307270), after an image of vector data is rendered to an image of raster data with a resolution lower than the resolution of the engine and the raster data is stored, and then the resolution of the stored raster data is converted into the resolution of the engine when the stored raster data is output. For this reason, this related art can stably reproduce a high-resolution image while reducing the memory area in a controller without using any method that requires difficult control such as spot-multiplexing. However, since the rendered raster data has a low-resolution, image reproducibility is not enough when compared to a case in which the vector data is directly rendered to high-resolution raster data. Therefore, the above related art is a resolution conversion technique which is not sufficient to restore a high-resolution image.

SUMMARY OF THE INVENTION

The present invention has been made in consideration of the conventional problems, and provides an image processing method and an image processing apparatus, which can restore a reproduced image close to an original image with reconverting half dots generated through filter processing of pseudo high-resolution conversion to data of output-resolution.

Therefore, there are provided an image processing method and an image processing apparatus, which can reproduce an image more stably than reproduction directly using half dots and prevent generation of jazzy that appears at an edge portion and the like.

Further, the present invention provides an image processing method and an image processing apparatus, which determine a pattern of a multi-level input image based on multi-level attribute data and then can flexibly designate an output pattern.

Therefore, there are provided an image processing method and an image processing apparatus, which can restore an image that has undergone pseudo high-resolution conversion at higher precision than the conventional resolution conversion and therefore, cope with small fonts and thin lines.

In order to solve the aforementioned problems, an image processing method according to the present invention of converting a multi-level image having a first resolution into a multi-level image having a second resolution lower than the first resolution and then restoring the multi-level image having the first resolution from the multi-level image having the second resolution, the method comprises the steps of: generating and holding, in a conversion from the multi-level image having the first resolution into the multi-level image having the second resolution, attribute data including a conversion processed flag indicating a kind of the conversion and a conversion result, associated with pixel data of a pixel of interest undergone the conversion corresponding to an attribute flag indicating an attribute in which a pixel before the conversion is located; and replacing, in a restoration of the multi-level image having the first resolution from the multi-level image having the second resolution, the pixel data of the pixel of interest with pixel data of a plurality of pixels in correspondence with pixel data of pixels around the pixel of interest and the conversion processed flag in the attribute data held associated with the pixel data of the pixel of interest.

An image processing apparatus according to the present invention for converting a multi-level image having a first resolution into a multi-level image having a second resolution lower than the first resolution, and then restoring the multi-level image having the first resolution from the multi-level image having the second resolution, the apparatus comprises: a resolution conversion unit adapted to generate and hold, in a conversion from the multi-level image having the first resolution into the multi-level image having the second resolution, attribute data including a conversion processed flag indicating a kind of the conversion and a conversion result, associated with pixel data of a pixel of interest undergone the conversion corresponding to an attribute flag indicating an attribute in which a pixel before the conversion is located; and a resolution restoration unit adapted to replace, in a restoration of the multi-level image having the first resolution from the multi-level image having the second resolution, the pixel data of the pixel of interest with pixel data of a plurality of pixels in correspondence with pixel data of pixels around the pixel of interest and the conversion processed flag in the attribute data held associated with the pixel data of the pixel of interest.

An image processing method according to the present invention of converting a multi-level image having a first resolution into a multi-level image having a second resolution lower than the first resolution, the method comprises a step of: generating and holding, attribute data including a conversion processed flag indicating a kind of the conversion and a conversion result, associated with pixel data of a pixel of interest undergone the conversion corresponding to an attribute flag indicating an attribute in which a pixel before the conversion is located.

An image processing apparatus according to the present invention for converting a multi-level image having a first resolution into a multi-level image having a second resolution lower than the first resolution, the apparatus comprises: a resolution conversion unit adapted to generate and hold, attribute data including a conversion processed flag indicating a kind of the conversion and a conversion result, associated with pixel data of a pixel of interest undergone the conversion corresponding to an attribute flag indicating an attribute in which a pixel before the conversion is located.

A reproduced image close to an original image can be restored with reconverting halftone dots generated through filter processing of pseudo high-resolution conversion to data of output-resolution. Hence, an image can be restored more stable than reproduction directly using half dots, and generation of jazzy that appears at an edge portion and the like can be prevented.

Furthermore, a pattern of a multi-level input image is determined based on multi-level attribute data, and then an output pattern can be flexibly designated. Hence, an image that has undergone pseudo high-resolution conversion can be restored at higher precision than the conventional resolution conversion, and therefore, small fonts and thin lines can be coped with.

Further features of the present invention will become apparent from the following description of exemplary embodiments with reference to the attached drawings.

BRIEF DESCRIPTION OF THE DRAWINGS

FIGS. 3A and 3B show examples of a pseudo high-resolution conversion table used in pseudo high-resolution conversion processing in a pseudo high-resolution conversion processing unit according to the embodiment;

FIG. 15 shows an example of a table in which the matching-patterns and pixel replacing patterns are corresponded, used in the high-resolution conversion processing unit according to the embodiment;

Figure 34:
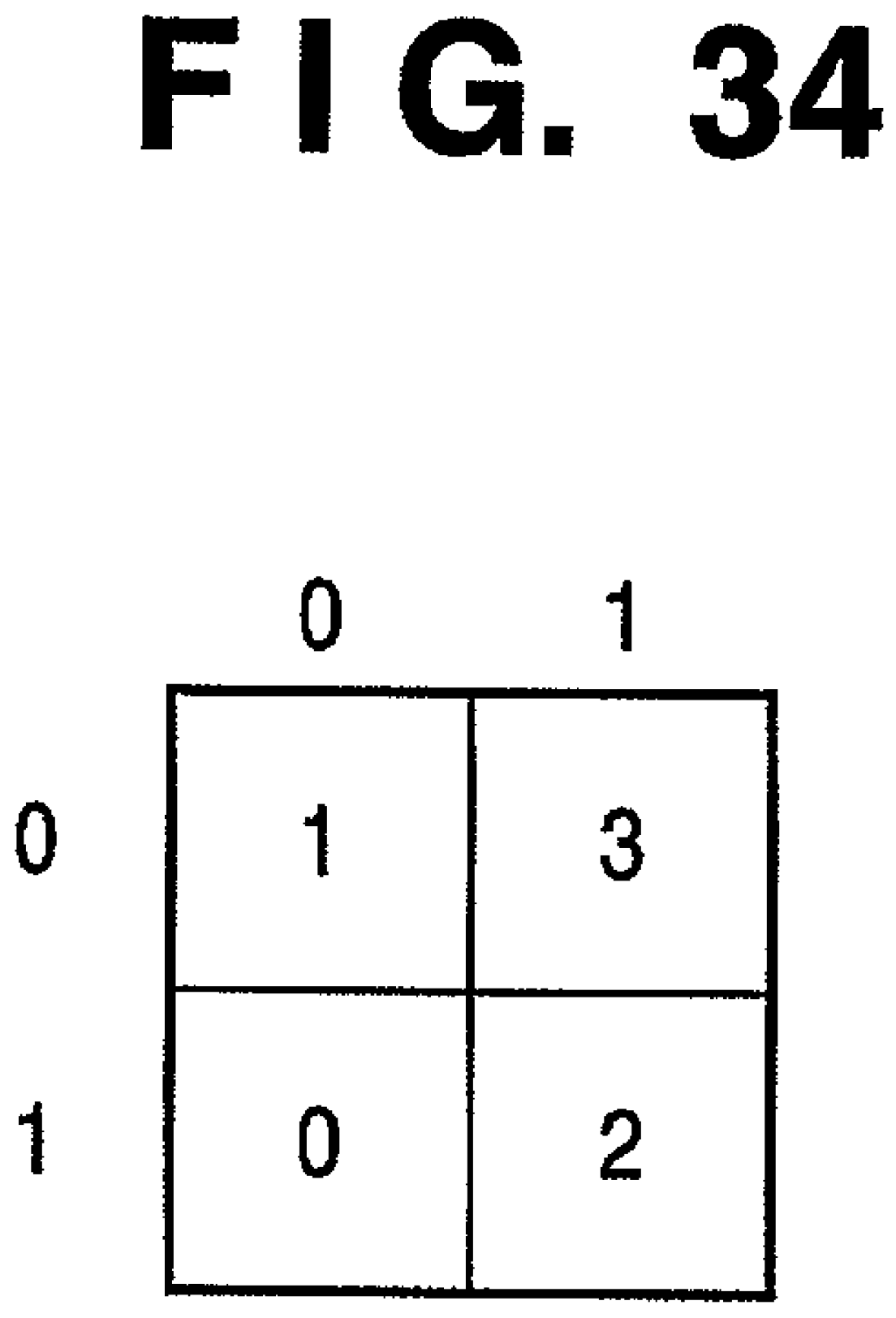

FIG. 34 shows an example of a pixel replacing pattern generated by giving an order of output pixels executed by the high-resolution conversion processing unit according to the embodiment.

DETAILED DESCRIPTION OF THE EMBODIMENTS

Preferred embodiments of the present invention will be described in detail hereinafter. In the following embodiments, a printing apparatus will be exemplified as an image processing apparatus to which the present invention is applied. However, the present invention relatively relates to image processing which implements simple storing and processing of a high-resolution multi-level image, and good reproducibility to an original high-resolution image. Hence, the present invention is not limited to the printing apparatus. For example, an apparatus to which the present invention is applied may be a display apparatus, image storage apparatus, or image transmission apparatus.

<Example of Arrangement of Image Processing Apparatus of this Embodiment>

Figure 1A:
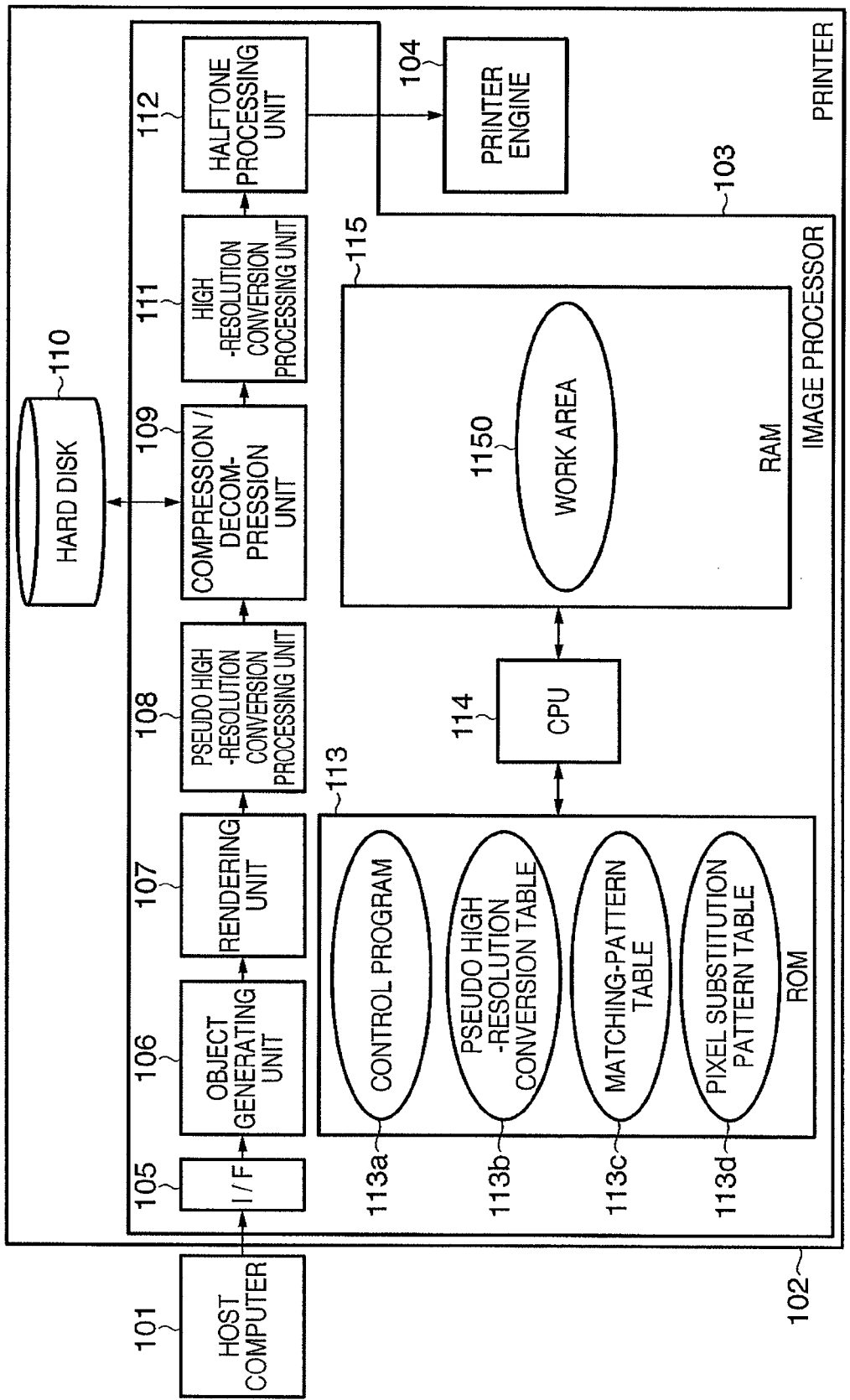
FIG. 1A is a block diagram showing an example of the arrangement of an image processing apparatus according to an embodiment of the present invention.

FIG. 1A is a block diagram for explaining the control arrangement of a printing apparatus (to be referred to as a printer hereinafter) as one embodiment of an image processing apparatus according to the present invention.

Referring to FIG. 1A, reference numeral 101 denotes a host computer which outputs print information, such as color information, text, graphic, image, the number of copies, and the like required to execute print processing, to a printer 102.

The printer 102 includes the following components. The printer 102 roughly includes an image processor 103 and a printer engine 104 which actually forms an image based on an image signal output from the image processor 103. The printer engine 104 has an engine resolution of 1200 dpi in this embodiment.

Principal components and their operations in the image processor 103 will be described below.

In the image processor 103, reference numeral 105 denotes an interface which controls exchange of print information with the host computer 101. An object generating unit 106 converts information such as color information, text, graphic, image, and the like as print information input from the host computer into intermediate information (to be referred to as objects hereinafter), and stores the intermediate information in a RAM 115.

A rendering unit 107 then generates a bit image to be formed so as to have, for example, 8 bits per pixel and a resolution of 1200 dpi based on the objects converted and stored by the object generating unit 106, and stores the generated bit image in the RAM 115. At this time, the rendering unit 107 generates multi-level data (to be referred to as attribute data hereinafter) given object information as flags (to be referred to as attribute flags hereinafter), in correspondence to each pixel of the rendered image based on the print information appended to the objects. The attribute flags to be generated by the rendering unit 107 include a color/monochrome flag, font flag, graphic flag, image flag, and thin line flag.

A pseudo high-resolution conversion processing unit 108 applies pseudo high-resolution conversion processing (to be described later) to the rendered image with the resolution of 1200 dpi based on the attribute data, thus generating an image with a resolution of 600 dpi. The pseudo high-resolution conversion processing unit 108 also sets various attribute flags to be described later as attribute data. This pseudo high-resolution conversion processing unit 108 corresponds to a resolution conversion unit which converts a multi-level image of a first resolution into a multi-level image of a second resolution lower than the first resolution.

A compression/decompression unit 109 compresses the bit image with the resolution of 600 dpi and attribute data, which have been generated by the rendering unit 107 and undergone the pseudo high-resolution conversion by the pseudo high-resolution conversion processing unit 108, and spools and stores the compressed bit image and attribute data in a hard disk 110.

The compression/decompression unit 109 reads out the compressed and stored bit image and attribute data from the hard disk 110 in response to the next processing request, decompresses the compressed bit image and attribute data, and outputs the decompressed bit image and attribute data to a high-resolution conversion processing unit 111.

The high-resolution conversion processing unit 111 applies high-resolution conversion processing (to be described later) to the bit image with the resolution of 600 dpi decompressed by the compression/decompression unit 109 based on the attribute flags of the similarly decompressed attribute data, so as to restore the bit image of the resolution of 1200 dpi. The high-resolution conversion processing unit 111 includes line buffers to form a window for the high-resolution conversion processing to be described later. In this embodiment, bitmap data for four lines are delayed to form a window configured by 5×5 pixels, and the high-resolution conversion processing is implemented based on a window-pattern appearing in the formed window. The high-resolution conversion processing unit 111 corresponds to a resolution restore unit which restores the multi-level image of the first resolution from the multi-level image of the second resolution lower than the first resolution.

The bit image restored to the resolution of 1200 dpi undergoes halftone processing in a halftone processing unit 112 to reduce its tone levels to output tones, and the processed bit image is output to the printer engine 104, thus forming an image on a print medium.

Reference numeral 114 denotes a central processing unit (CPU) which executes determination and control in various kinds of processing by the respective processing units in accordance with programs stored in a ROM 113. Reference numeral 113 denotes a ROM (read-only memory). The ROM 113 stores various control programs 113a including programs shown in the flowcharts of FIGS. 5, 6, 16, and 24, a pseudo high-resolution conversion table 113b, a matching-pattern table 113c and a pixel replacing pattern table 113d. Reference numeral 115 denotes a RAM (random access memory), which stores data and status information required for the CPU 114 to execute determination and control in respective processing in accordance with the programs stored in the ROM 113, and is also used as a work area 1150.

(Example of Storage Configuration of ROM 113 and RAM 115)

Figure 1B:
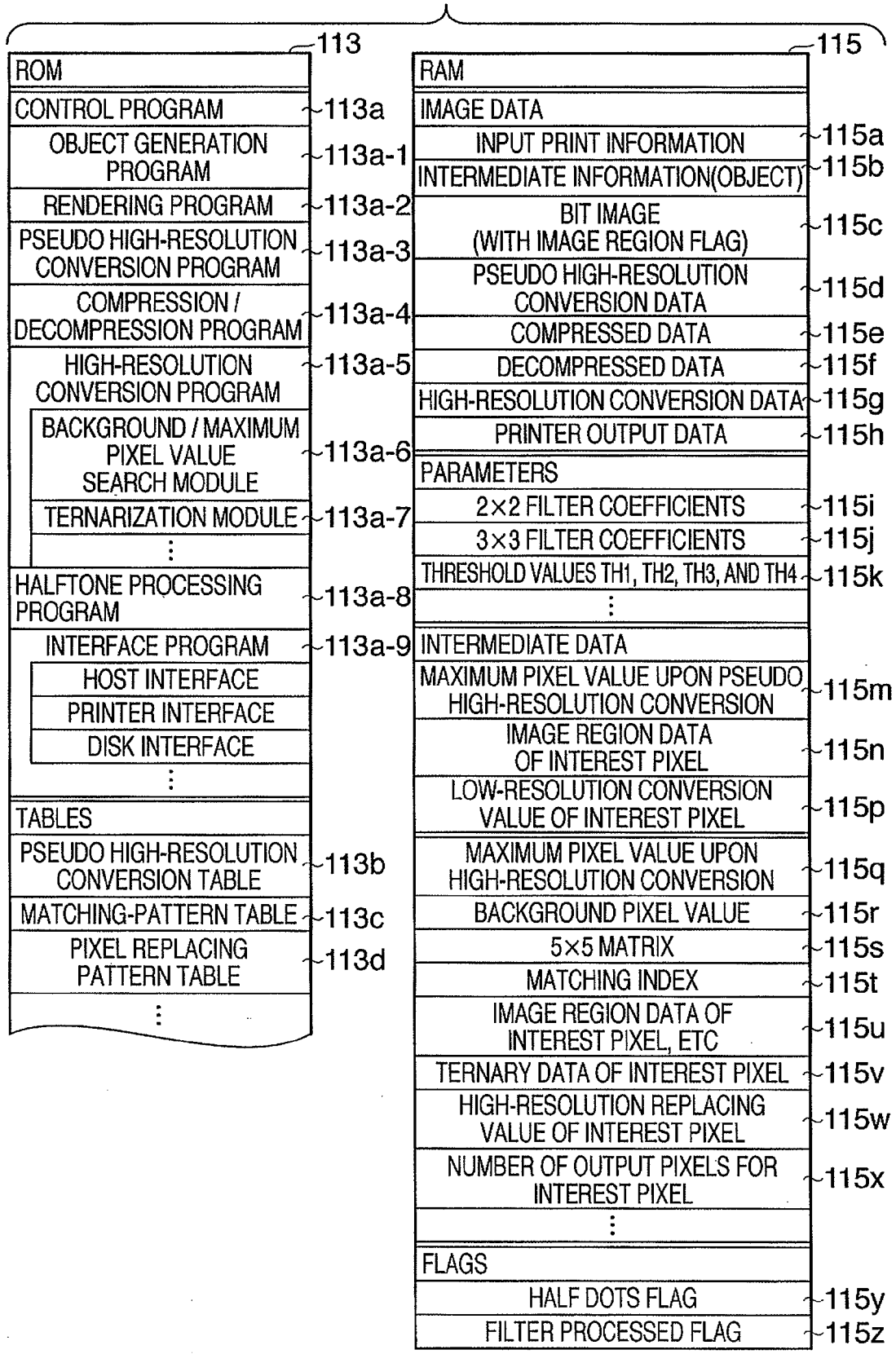
FIG. 1B shows an example of the storage configuration of a RAM 115.

FIG. 1B shows an example of the storage configuration of the ROM 113 and RAM 115 according to this embodiment. Note that FIG. 1B shows only programs and data closely related to this embodiment, but does not show general or poorly related programs and data.

An example of the storage configuration of the ROM 113 will be described first. Reference numerals in FIG. 1B correspond to those in FIG. 1A.

The control programs 113a include the following programs and modules in this embodiment. In order to implement the respective processing units shown in FIG. 1A, the ROM 113 stores the following programs. That is, the ROM 113 stores an object generation program 113a-1, rendering program 113a-2, pseudo high-resolution conversion program 113a-3, compression/decompression program 113a-4, high-resolution conversion program 113a-5, and halftone processing program 113a-8. The high-resolution conversion program 113a-5 as a feature of this embodiment includes a background/maximum pixel value search module 113a-6, ternarization module 113a-7, and the like. Furthermore, the ROM 113 stores an interface program 113a-9 which controls interfaces with external devices by the image processor 103 shown in FIG. 1A. For example, the interfaces include a host interface for controlling an interface with the host computer 101, a printer interface for controlling an interface with the printer engine 104, and a disk interface for controlling an interface with the hard disk 110. Also, the interfaces include a user interface for controlling an interface with the user via a display operation unit (not shown).

The ROM 113 stores the pseudo high-resolution conversion table 113b, pattern-matching table 113c, and pixel replacing pattern table 113d as tables used in this embodiment.

In the RAM 115 as the work area, areas for storing the following data used in this embodiment are allocated.

The RAM 115 stores the following data as image data between the input from the host computer 101 and the output to the printer engine 104. That is, the RAM 115 stores input print information 115a as image data from the host computer 101, intermediate information 115b in an object type generated by the object generating unit 106, and a bit image 115c with attribute flags rendered by the rendering unit 107. Also, the RAM 115 stores pseudo high-resolution conversion data 115d with attribute data including attribute flags, which has been converted into low-resolution data by the pseudo high-resolution conversion processing unit 108, and compressed data 115e which has been compressed by the compression/decompression unit 109 and is to be stored in the hard disk 110. The RAM 115 stores decompressed data 115f (which is approximately equal to the pseudo high-resolution conversion data 115d) which has been read out from the hard disk 110 and decompressed by the compression/decompression unit 109. The RAM 115 stores high-resolution conversion data 115g which has been restored to have a high-resolution by the high-resolution conversion processing unit 111 of this embodiment, and printer output data 115h which has undergone the halftone processing by the halftone processing unit 112, and is to be output to the printer engine 104.

As parameters used in respective processing, the RAM 115 stores 2×2 filter coefficients 115i and 3×3 filter coefficients 115j, which are used in filter processing of the pseudo high-resolution conversion processing unit 108 of this embodiment. The RAM 115 stores threshold values 115k (TH1 to TH4) for pixel values used in the second embodiment.

As intermediate data to be temporarily stored during the processing of this embodiment, the RAM 115 stores the following data. That is, the RAM 115 stores a maximum pixel value 115m in the processing of the pseudo high-resolution conversion processing unit 108, and attribute data (including an attribute flag) 115n of a pixel of interest. The RAM 115 stores a maximum pixel value 115q, background pixel value 115r, 5×5 matrix 115s, and matching index 115t as a matching processing result in the processing of the high-resolution conversion processing unit 111. Also, the RAM 115 stores attribute data (including an attribute flag) etc. 115u, ternary data 115v, high-resolution replacing value 115w, and the number of output pixels 115x (used in the second embodiment) for the pixel of interest.

As flags used in branches and the like of the processes of this embodiment, the RAM 115 temporarily stores, for each pixel data, a half dots flag 115y indicating halftone and a filter processed flag 115z as conversion processing flags indicating the resolution conversion processing and processing result. These flags are generated based on the processing result of the pseudo high-resolution conversion processing unit 108, and are held as attribute data indicating an attribute.

<Operation Example of Image Processing Apparatus of this Embodiment>

<Arrangement and Operation Example of Pseudo High-Resolution Conversion Processing Unit 108>

An example of the arrangement and operation of the pseudo high-resolution conversion processing unit 108 in the image processor 103 of the image processing apparatus 102 of this embodiment will be described first with reference to FIGS. 2 to 4. Note that this embodiment will exemplify processing for converting a multi-level image with the resolution of 1200 dpi as the first resolution into a multi-level image with the resolution of 600 dpi as the second resolution, compressing and holding the multi-level image with the resolution of 600 dpi, and restoring the multi-level image with the resolution of 1200 dpi as the first resolution from the multi-level image with the resolution of 600 dpi as the second resolution. However, the present invention is not limited to such a specific example.

Figure 2:
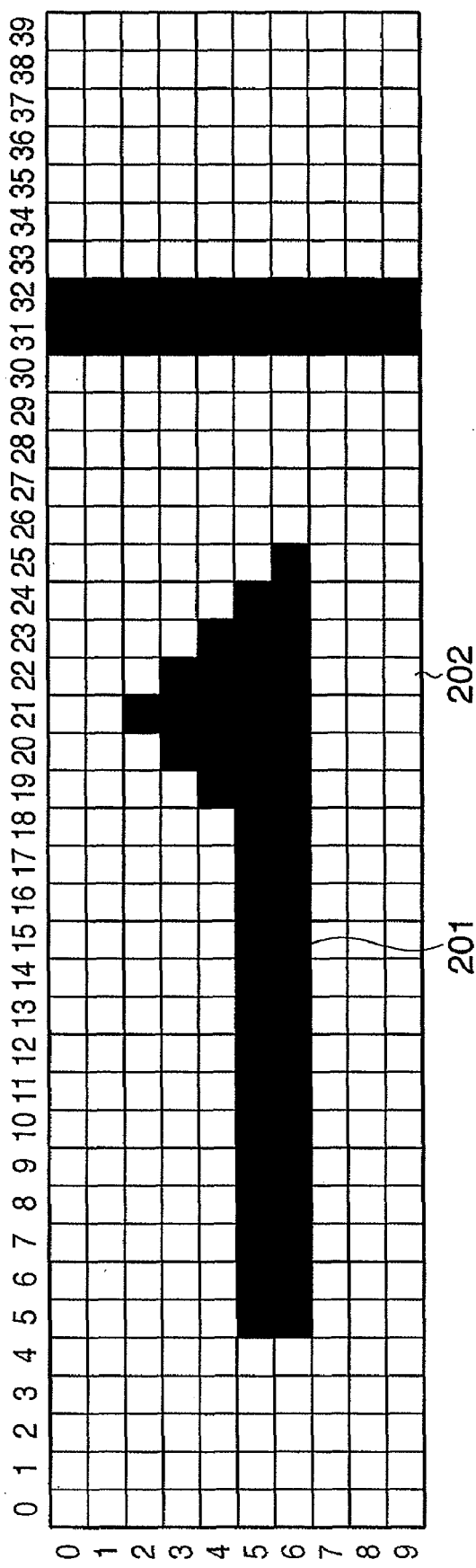
FIG. 2 shows an example of a 1200 dpi bit image according to the embodiment.

FIG. 2 shows an example showing a part of a bit image with the resolution of 1200 dpi, which is rendered by the rendering unit 107. FIGS. 3A and 3B show examples of filter coefficients used in filter processing to be described later. FIG. 4 shows an example of the conversion result of the bit image shown in FIG. 2 by the pseudo high-resolution conversion processing executed by the pseudo high-resolution conversion processing unit 108.

The pseudo high-resolution conversion processing unit 108 converts an input image, which is rendered to a bit image with the resolution of 1200 dpi by the rendering unit 107, into low-resolution data. The conversion processing to low-resolution data is implemented by 2×2 filter processing or 3×3 filter processing (to be described later) using the pseudo high-resolution conversion table 113b shown in FIGS. 3A and 3B, thinning processing of a value of a pixel of interest (to be described later), or replacement processing of a maximum pixel value (to be described later).

These processes are executed using, as a pixel of interest, a pixel at which both coordinate values of pixel coordinates (i, j) in an input image shown in FIG. 2 are odd values. The aforementioned processes are switched as needed based on the pixel value of the pixel of interest and attribute flags corresponding to the pixel of interest and neighboring pixels around the pixel of interest, and the switched process is applied to the pixel of interest and neighboring pixels. By applying these processes to the entire bit image of 1200 dpi as changing the pixel of interest in turn, a bit image of 600 dpi which is half the resolution is generated in this embodiment.

(2×2 Filter Processing Example)

FIG. 3A shows an example of 2×2 filter coefficients.

For example, for the input image shown in FIG. 2, if a pixel at image coordinates ($i_{odd}$, $j_{odd}$) in which both coordinate values are odd values, is selected as a pixel of interest in the input image, the aforementioned 2×2 filter processing generates one pixel in a bit image with the resolution of 600 dpi by calculating with the following equation (1):

$$D_{out} = \quad (1)$$
$$F_{2\times 2}(0, 0) \times D_{in}(i_{odd} - 1, j_{odd} - 1) + F_{2\times 2}(1, 0) \times D_{in}(i_{odd}, j_{odd} - 1) +$$
$$F_{2\times 2}(0, 1) \times D_{in}(i_{odd}, j_{odd} - 1) + F_{2\times 2}(1, 1) \times D_{in}(i_{odd}, j_{odd})$$

where $D_{in}(i, j)$ is the pixel value at image coordinates (i, j) in an input image with the resolution of 1200 dpi, and $D_{out}$ is the pixel value at image coordinates corresponding to the coordinates (i, j) of the input image, in an output image with the resolution of 600 dpi generated by the 2×2 filter processing. $F_{2\times 2}(x, y)$ is the value of a weighting coefficient at coordinates (x, y) of the 2×2 filter shown in FIG. 3A.

(3×3 Filter Processing Example)

FIG. 3B shows an example of 3×3 filter coefficients.

The aforementioned 3×3 filter processing is executed in the same manner as in the aforementioned 2×2 filter processing. For example, for the input image shown in FIG. 2, if a pixel at image coordinates ($i_{odd}$, $j_{odd}$) r in which both coordinate values are odd values, is selected as a pixel of interest in the input image, the aforementioned 3×3 filter processing generates one pixel of a bit image with the resolution of 600 dpi by calculating with the following equation (2):

$$D_{out} = \quad (2)$$
$$F_{3\times 3}(0, 0) \times D_{in}(i_{odd} - 1, j_{odd} - 1) + F_{3\times 3}(1, 0) \times D_{in}(i_{odd}, j_{odd} - 1) +$$
$$F_{3\times 3}(2, 0) \times D_{in}(i_{odd} + 1, j_{odd} - 1) +$$
$$F_{3\times 3}(0, 1) \times D_{in}(i_{odd} - 1, j_{odd}) +$$
$$F_{3\times 3}(1, 1) \times D_{in}(i_{odd}, j_{odd}) + F_{3\times 3}(2, 1) \times D_{in}(i_{odd} + 1, j_{odd}) +$$
$$F_{3\times 3}(0, 2) \times D_{in}(i_{odd} - 1, j_{odd} + 1) +$$
$$F_{3\times 3}(1, 2) \times D_{in}(i_{odd}, j_{odd} + 1) + F_{3\times 3}(2, 2) \times D_{in}(i_{odd} + 1, j_{odd} + 1)$$

where $D_{in}(i, j)$ is the pixel value at image coordinates (i, j) in an input image with the resolution of 1200 dpi, and $D_{out}$ is the pixel value at image coordinates corresponding to the coordinates (i, j) of the input image, in an output image with the resolution of 600 dpi generated by the 3×3 filter processing. $F_{3\times 3}(x, y)$ is the value of a weighting coefficient at coordinates (x, y) of the 3×3 filter shown in FIG. 3B.

(Thinning Processing Example)

The aforementioned thinning processing of the value of a pixel of interest is executed as follows in this embodiment. For example, for the input image shown in FIG. 2, if a pixel at image coordinates ($i_{odd}$, $j_{odd}$), in which both coordinate values are odd values, is selected as a pixel of interest in the input image, one pixel in a bit image is generated using its pixel value $D_{in}(i_{odd}, j_{odd})$ as an output image value $D_{out}$. On the other hand, if a pixel at image coordinates in which at least one of coordinate values is even value, is selected as a pixel of interest in the input image, no pixel is generated in the output image. That is, since this process corresponds to thinning of one pixel at 1-pixel intervals, it is equivalent to processing for generating one pixel at the resolution of 600 dpi.

(Replacement Processing Example)

The aforementioned replacement processing of a maximum pixel value is executed as follows in this embodiment. For example, for the input image shown in FIG. 2, if a pixel at image coordinates ($i_{odd}$, $j_{odd}$), in which both coordinate values are odd values, is selected as a pixel of interest in the input image, a maximum pixel value is detected from the following pixels, and the detected maximum pixel value is generated as $D_{out}$ of one pixel in a bit image with the resolution of 600 dpi. For example, a maximum pixel value is detected from four pixels with pixel values $D_{in}(i_{odd}-1, j_{odd}-1)$, $D_{in}(i_{odd}, j_{odd}-1)$ r $D_{in}(i_{odd}-1, j_{odd})$ and $D_{in}(i_{odd}, j_{odd})$. Alternatively, a maximum pixel value is detected from the following nine pixels. The nine pixels include the three upper pixels $D_{in}(i_{odd}-1, j_{odd}-1)$, $D_{in}(i_{odd}, j_{odd}-1)$, and $D_{in}(i_{odd}+1, j_{odd}-1)$. Also, the nine pixels include the three central pixels $D_{in}(i_{odd}-1, j_{odd})$, $D_{in}(i_{odd}, j_{odd})$, and $D_{in}(i_{odd}+1, j_{odd})$. Furthermore, the nine pixels include the three lower pixels $D_{in}(i_{odd}-1, j_{odd}+1)$, $D_{in}(i_{odd}, j_{odd}+1)$, and $D_{in}(i_{odd}+1, j_{odd}+1)$.

(Switching Example of Resolution Conversion)

The aforementioned processes are switched as needed based on the attribute flags in the attribute data corresponding to each pixel in the input image. An example of such switching processing will be described below.

When an image flag in attribute data corresponding to a pixel of interest or neighboring pixels is ON, or there is no flag, the thinning processing of the pixel of interest is selected. When graphic flags of a pixel of interest and neighboring pixels are ON, the replacement processing with a maximum pixel value is selected. In a case other than the above conditions, a filter having weighting coefficients according to the pixel value of a pixel of interest is selected, and the filter processing using the selected filter is applied to the pixel of interest and neighboring pixels.

Upon application of the filter processing, a filter processed flag is appended to the attribute data of the pixel of interest irrespective of the 2×2 filter processing or 3×3 filter processing. For a pixel of which a pixel value generated and output by the filter processing becomes smaller than the pixel value of the pixel of interest before the filter processing, a half dots flag is appended as the attribute data.

(Result Example of Pseudo High-Resolution Conversion Processing)

Figure 4:
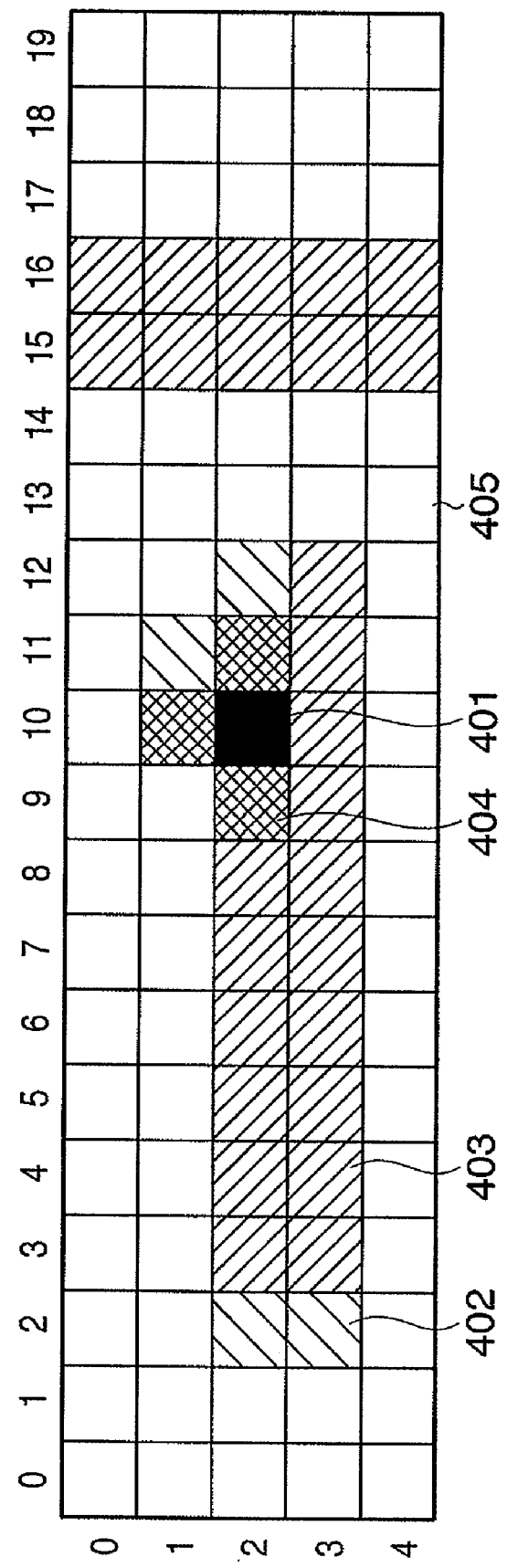
FIG. 4 shows an example of a 600 dpi bit image generated by the pseudo high-resolution conversion processing in the pseudo high-resolution conversion processing unit according to this embodiment.

FIG. 4 shows an example of a bit image with a resolution of 600 dpi which is generated by applying the pseudo high-resolution conversion processing to a part of the bit image with the resolution of 1200 dpi shown in FIG. 2 based on the aforementioned rules of the attribute flags. FIG. 2 shows an example in which pixels 201 painted in black have a pixel value "a" and a font flag=ON, and pixels 202 in white have neither values nor flags.

According to the aforementioned rules of the attribute flags, the filter processing is applied to pixels, of which the pixel of interest or neighboring pixels has a font flag. As a result, the pixels 201 painted in black in FIG. 2 are converted into corresponding ones of a pixel 401 painted in black, and pale pixels 402, medium pixels 403 and dark pixels 404 respectively indicated by different hatching. On the other hand, pixels having no flag in FIG. 2 are replaced with pixels 405 in white by the thinning processing of a pixel of interest.

The pixel 401 painted in black in FIG. 4 has the same pixel value "a" as the pixels 201 painted in black in FIG. 2, and is appended with a filter processed flag by the conversion processing. The pale pixels 402 indicated by thin hatching in FIG. 4 have a pixel value "a/4" calculated by the filter processing, and have a font flag=ON, filter processed flag ON, and half dots flag=ON. The medium pixel 403 indicated by medium hatching in FIG. 4 have a pixel value 2a/4 calculated by the filter processing, and have a font flag=ON, filter processed flag ON, and half dots flag=ON. The dark pixels 404 indicated by dense hatching in FIG. 4 have a pixel value 3a/4, and have a font flag=ON, filter processed flag ON, and half dots flag=ON.

Note that the filter coefficients used in the filter processing to be applied are constant irrespective of the pixel value of the pixel of interest, and that only the 2×2 filter shown in FIG. 3A is used for the sake of simplicity. Of course, as is easily understood, it is more effectively to apply the filter processing by switching a large number of filter coefficients in correspondence with the pixel value of the pixel of interest.

<Arrangement and Operation Example of High-Resolution Conversion Processing Unit 111 of First Embodiment>

An example of the overall sequence of the high-resolution conversion processing executed by the high-resolution conversion processing unit 111 of the first embodiment will be described below with reference to the flowchart shown in FIG. 5.

The high-resolution conversion processing unit 111 receives the bit image with the resolution of 600 dpi and the attribute data, which are decompressed by the aforementioned compression/decompression unit 109. The high-resolution conversion processing unit 111 delays the received data using line buffers for four lines, and then generates a window defined by 5×5 pixels having the center coordinates as a pixel of interest from the bit image in the line buffers (S501).

The high-resolution conversion processing unit 111 determines whether or not the pixel of interest is generated by the filter processing, based on the attribute data corresponding to the pixel of interest at the center coordinates (S502).

If the high-resolution conversion processing unit 111 determines in step S502 that the pixel of interest is generated by the filter processing, the high-resolution conversion processing unit 111 extracts a background pixel value and a maximum pixel value in the image from the window or line buffers by background/maximum pixel value search processing to be described later (S503). The high-resolution conversion processing unit 111 then determines whether or not the pixel of interest is converted into a half dot by the filter processing based on the attribute data corresponding to the pixel of interest at the center coordinates and whether or not the background pixel value and maximum pixel value can be calculated by the above background/maximum pixel value search processing in step S503 (S504).

If the high-resolution conversion processing unit 111 determines in step S504 that the pixel of interest is converted into a half dot, and the background pixel value and maximum pixel value have been calculated, the high-resolution conversion processing unit 111 checks an index of a matching-pattern to be described later to determine the presence/absence of a matching-pattern for the next processing (S505). If the high-resolution conversion processing unit 111 determines in step S505 that a matching-pattern for the next processing is present, the high-resolution conversion processing unit 111 sets the matching-pattern and a corresponding pixel replacing pattern (S506).

The high-resolution conversion processing unit 111 applies ternarization processing (to be described later) to respective pixels in the window generated in step S501 based on the attribute data corresponding to the respective pixels in the window (S507). The high-resolution conversion processing unit 111 executes pattern matching (to be described later) between a window-pattern of pixels ternarized by the ternarization processing (S507) and the matching-pattern set in step S506 (S508. The high-resolution conversion processing unit 111 determines whether or not the ternarized window-pattern matches the matching-pattern set in the pattern matching in step S508 (S509).

As a result of the determination, if the both patterns match, the high-resolution conversion processing unit 111 executes pixel replacement processing (to be described later) with the pixel replacing pattern corresponding to the matching-pattern (S510). If the high-resolution conversion processing unit 111 determines that the window-pattern does not match the matching-pattern, the process returns to step S505.

If the high-resolution conversion processing unit 111 determines in the aforementioned attribute determination processing (S502) that the pixel of interest is not generated by the filter processing, that is, the pixel of interest is generated by the thinning processing of a pixel of interest or the replacement processing with a maximum pixel, the high-resolution conversion processing unit 111 replaces the pixel value of the pixel of interest with four pixel values to be output with maintaining the pixel values (S511). Furthermore, if the high-resolution conversion processing unit 111 determines in the half dot determination processing (S504) that the pixel of interest is not converted into a half dot or the background pixel value and maximum pixel value have not been calculated, the high-resolution conversion processing unit 111 similarly executes the pixel replacement processing in step S511. Moreover, if the high-resolution conversion processing unit 111 determines in the matching-pattern determination processing (S505) that all the pattern matching processes are complete, the high-resolution conversion processing unit 111 similarly executes the pixel replacement processing in step S511.

The high-resolution conversion processing unit 111 outputs the four pixel values generated in either step S510 or S511 as four pixel values of a 1200-dpi image for the pixel of interest of the 600-dpi image (S512). Finally, the high-resolution conversion processing unit 111 determines whether or not the end of the line buffer has been reached (S513). If the end has been reached, the high-resolution conversion processing unit 111 ends the current processing, and waits for the processing of the next line. Otherwise, the process returns to step S501 for the next pixel processing.

(Sequence Example of Background/Maximum Pixel Value Search Processing S503)

An example of the detailed processing sequence of the aforementioned background/maximum pixel value search processing in step S503 will be described below with reference to the flowchart shown in FIG. 6.

Figure 5:
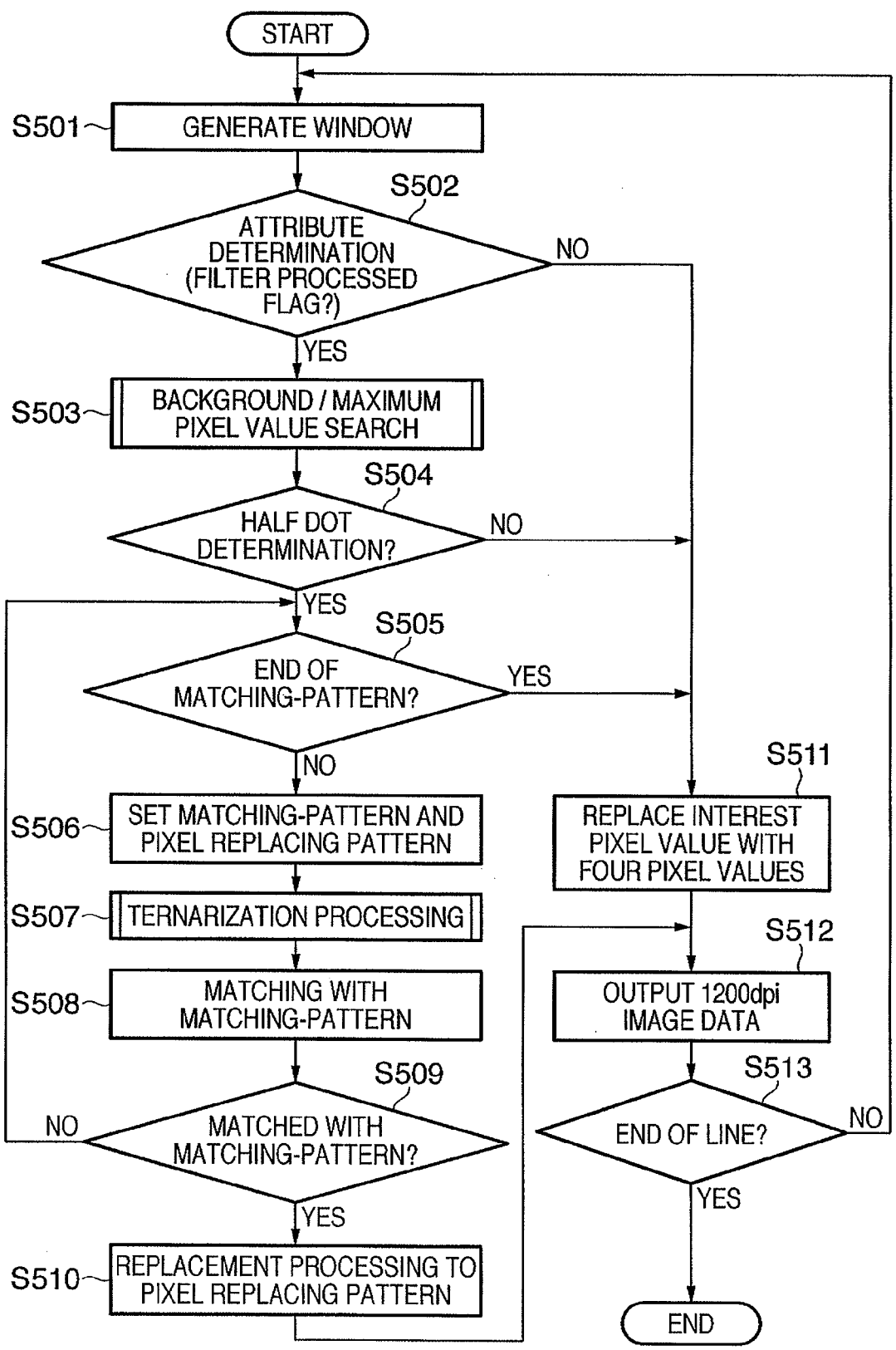
FIG. 5 is a flowchart showing the overall high-resolution conversion processing executed by a high-resolution conversion processing unit according to the first embodiment.

The high-resolution conversion processing unit 111 sequentially scans pixels in the window generated in step S501 of FIG. 5 to search for a background pixel and maximum pixel based on the attribute data corresponding to these pixels (S601). Note that the background pixel indicates a pixel which has a filter processed flag=OFF in the attribute data corresponding to that pixel, and is nearest to the pixel of interest. The maximum pixel indicates a pixel which has a filter processed flag=ON and half dots flag=OFF in the attribute data corresponding to that pixel, and is nearest to the pixel of interest.

The high-resolution conversion processing unit 111 determines whether or not the background pixel and maximum pixel are detected from the window (S602). If the high-resolution conversion processing unit 111 determines that both the background pixel and maximum pixel have been detected, the high-resolution conversion processing unit 111 outputs the pixel values corresponding to these pixels as a background pixel value and maximum pixel value (S603).

The high-resolution conversion processing unit 111 executes the following processing when the high-resolution conversion processing unit 111 determines that the background pixel or maximum pixel has not been detected. That is, the high-resolution conversion processing unit 111 searches a background pixel and maximum pixel from pixels outside in a scan direction (the right direction in this embodiment) of the pixel coordinates defining the window in the line buffers used to generate the window, in accordance with rules to be described later (S604).

The high-resolution conversion processing unit 111 determines whether or not a background pixel and maximum pixel have been detected from pixels in the window or the line buffers (S605). If the background pixel and maximum pixel have been detected, the high-resolution conversion processing unit 111 outputs the pixel values corresponding to the background pixel and maximum pixel as a background pixel value and maximum pixel value in step S603. If the high-resolution conversion processing unit 111 determines that the background pixel or maximum pixel has not been detected, the high-resolution conversion processing unit 111 calculates a maximum pixel value (to be described later) in the window (S606).

The high-resolution conversion processing unit 111 determines whether or not the maximum pixel value can be calculated in the window and the background pixel can be detected (S607). If the maximum pixel value can be calculated and the background pixel can be detected, the high-resolution conversion processing unit 111 outputs the pixel values corresponding to the background pixel and maximum pixel as a background pixel value and maximum pixel value in step S603. If the maximum pixel value cannot be calculated or the background pixel cannot be detected, the high-resolution conversion processing unit 111 ends the present processing.

(Practical Example of Background/Maximum Pixel Value Search Processing)

Figure 7:
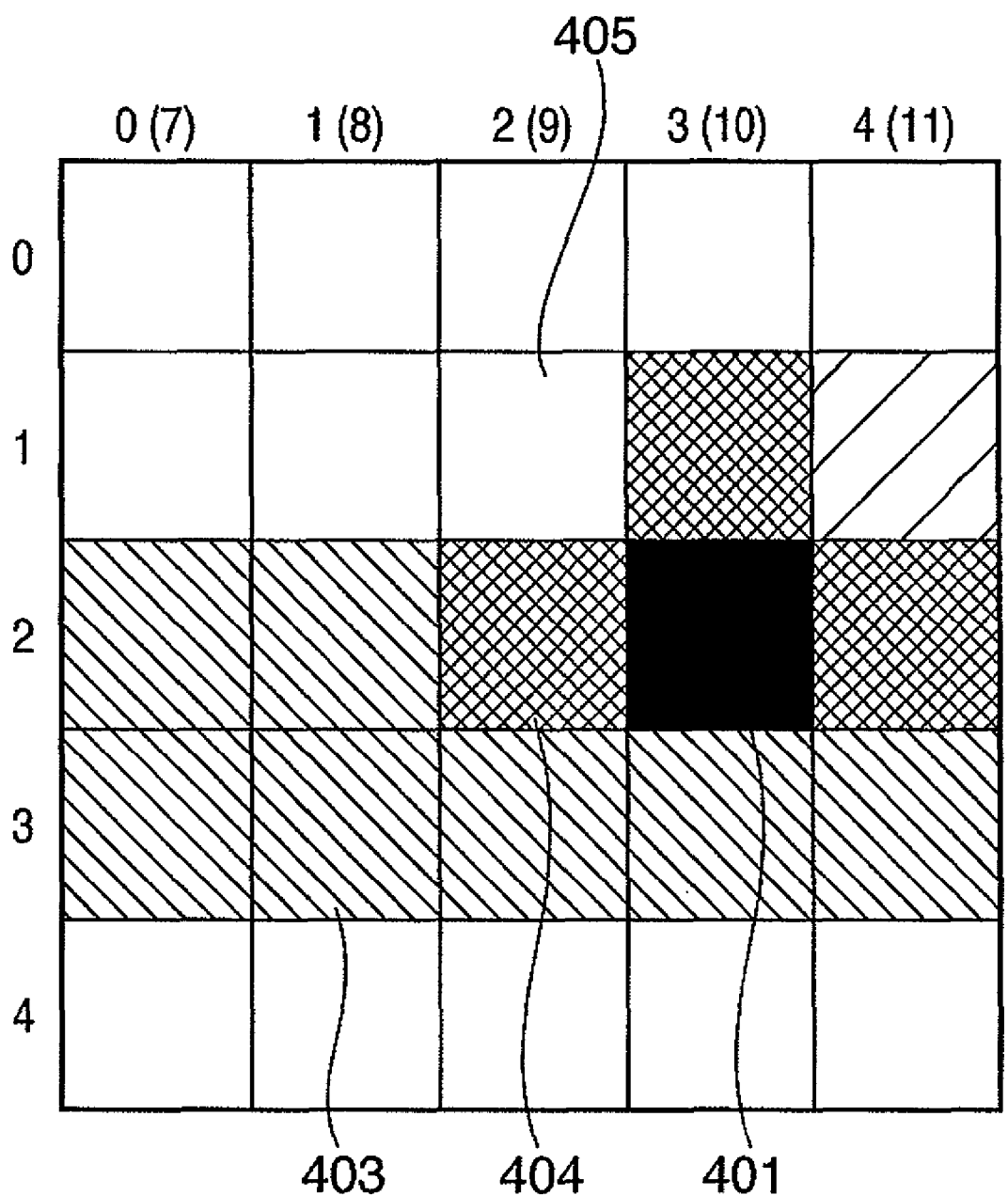
FIG. 7 shows an example of a window to be generated by the high-resolution conversion processing unit according to the embodiment.

FIG. 7 shows a window when a pixel at pixel coordinates (9, 2) is selected as a pixel of interest, in the image shown in FIG. 4 which is generated from the image in FIG. 2 by the pseudo high-resolution conversion processing. A practical example of the aforementioned background/maximum pixel value search processing will be described in detail below with taking FIG. 7 as an example. In FIG. 7, the window is defined by the aforementioned pixel 401, pixels 403, pixels 404, and pixels 405.

Figure 6:
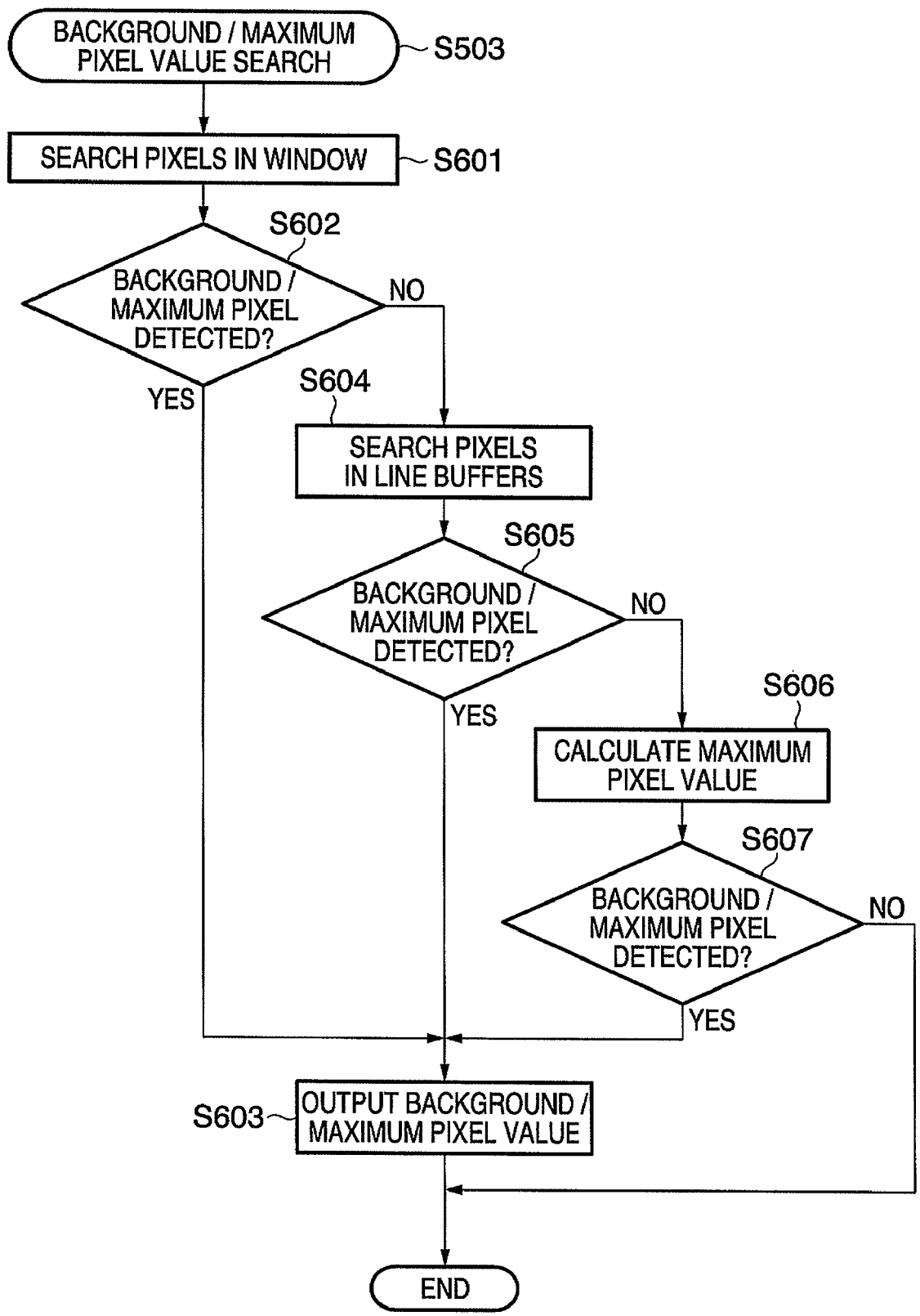
FIG. 6 is a flowchart showing background/maximum pixel value search processing according to the embodiment.

The background pixel to be detected in step S601 in FIG. 6 is a pixel which has a filter processed flag=OFF in the attribute data and is nearest to the pixel of interest, that is, the pixel 405 at pixel coordinates (2, 1) in the window. On the other hand, the maximum pixel to be detected is a pixel which has a filter processed flag=ON and half dots flag=OFF in the attribute data and is nearest to the pixel of interest, that is, the pixel 401 at pixel coordinates (3, 2) in the window. Therefore, a background pixel value "0" and maximum pixel value "a" are output in step S603 in FIG. 6.

Figure 8:
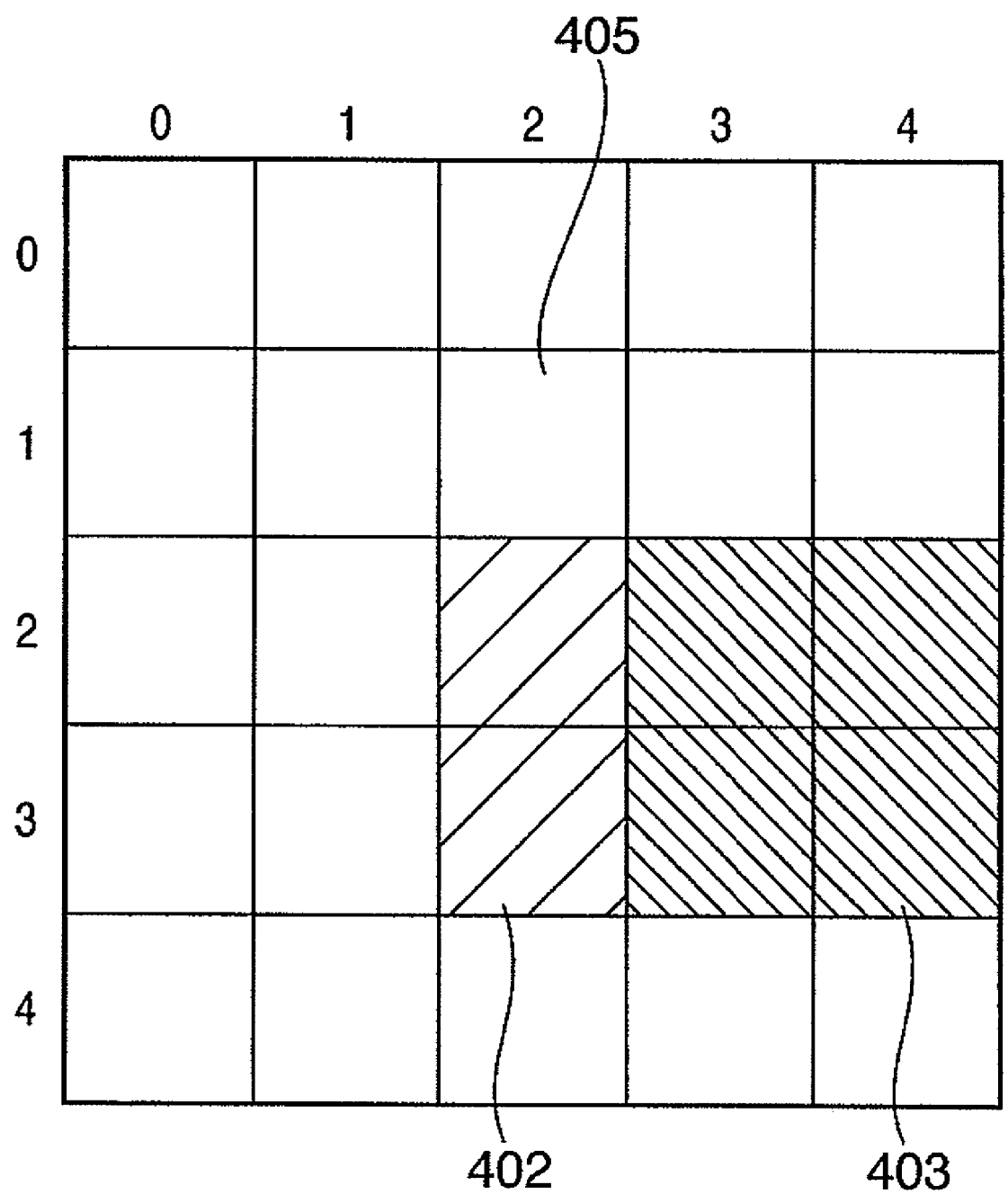
FIG. 8 shows an example of a window to be generated by the high-resolution conversion processing unit according to the embodiment.

FIG. 8 shows a window when a pixel at image coordinates (2, 2) is selected as a pixel of interest, in the image shown in FIG. 4 which is generated from that in FIG. 2 by the pseudo-high resolution conversion processing. The search operation for pixels in the line buffers in step S604 of the aforementioned background/maximum pixel value search processing will be described in detail below with taking FIGS. 4 and 8 as an example. In FIG. 8, the window is defined by the aforementioned pixels 402, pixels 403, and pixels 405.

The background pixel to be detected in step S601 in FIG. 6 is a pixel which has a filter processed flag OFF in the attribute data and is nearest to the pixel of interest, that is, the pixel 405 at pixel coordinates (2, 1) in the window. On the other hand, the maximum pixel to be detected is a pixel which has a filter processed flag=ON and half dots flag=OFF in the attribute data and is nearest to the pixel of interest, and the maximum pixel cannot be detected from pixels in the window. Hence, the search processing in the line buffers in step S604 in FIG. 6 is executed.

In the line buffers, the search processing is executed from pixels outside in the scan direction of the pixel coordinates defining the window. That is, pixels located at pixel coordinates on the right side from the pixel coordinates (5, 0), (5, 1), (5, 2), (5, 3) and (5, 4) in FIG. 4 are to undergo the search processing. The search processing is executed under a rule that the search processing continues until all five pixels located at the same position in scan direction in five line memories have had the all flags=OFF or until the end of the line has been reached. In FIG. 8, since a maximum pixel is detected at pixel coordinates (10, 2) in FIG. 4, a background pixel value "0" and maximum pixel value "a" are output in step S603 in FIG. 6.

Figure 9:
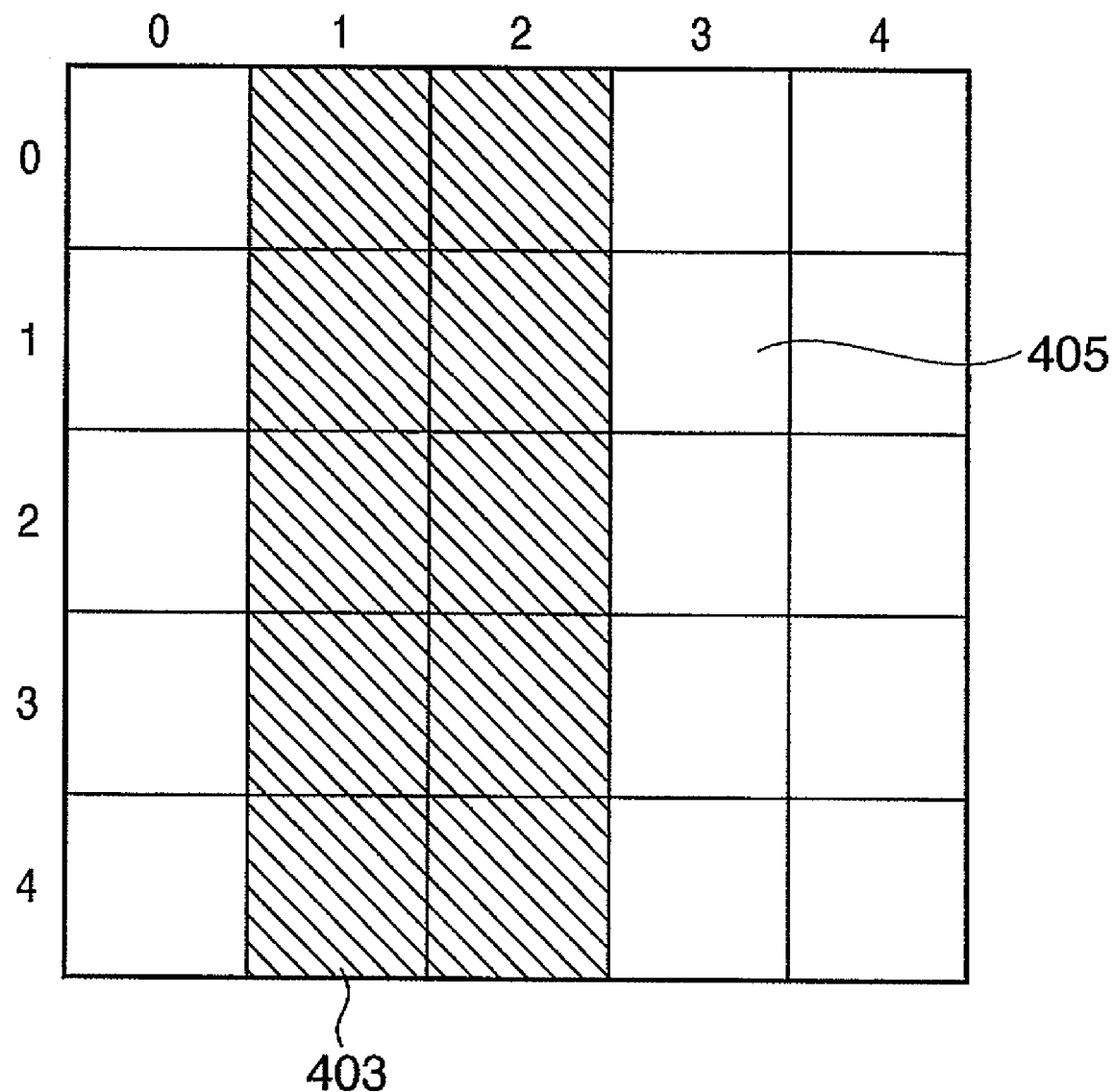
FIG. 9 shows an example of a window to be generated by the high-resolution conversion processing unit according to the embodiment.

FIG. 9 shows a window when a pixel at image coordinates (16, 2) is selected as a pixel of interest, in the image shown in FIG. 4 which is generated from that in FIG. 2 by the pseudo high-resolution conversion processing. The maximum pixel value calculation operation in step S606 of the aforementioned background/maximum pixel value search processing will be described in detail below with taking FIGS. 4 and 9 as an example. In FIG. 9, the window is defined by the aforementioned pixels 403 and pixels 405.

The background pixel to be detected in step S601 in FIG. 6 is a pixel which has a filter processed flag=OFF in the attribute data and is nearest to the pixel of interest, that is, the pixel 405 at pixel coordinates (3, 2) in the window. On the other hand, the maximum pixel to be detected is a pixel which has a filter processed flag=ON and half dots flag=OFF in the attribute data and is nearest to the pixel of interest, and the maximum pixel cannot be detected from pixels in the window. Hence, the search processing in the line buffers in step S604 in FIG. 6 is executed. The search range includes pixels which are located at pixel coordinates on the right side from pixel coordinates (19, 0), (19, 1), (19, 2), (19, 3) and (19, 4) in FIG. 4. However, since all five pixels have the all flags=OFF, the maximum pixel has not been detected in step S604 in FIG. 6. Hence, a maximum pixel value is calculated in step S606 in FIG. 6.

The maximum pixel value is calculated under conditions to be described later in which the filter used in the filter processing executed by the pseudo high-resolution conversion processing unit 108 and the filter coefficients are limited. The above conditions are satisfied when only the 2×2 filter processing is used and when a bit image has undergone the pseudo high-resolution conversion processing in which the filter coefficients are not changed according to pixel values. In this case, this processing can be executed with reference to a registry in which the settings of the pseudo high-resolution conversion processing unit 108 are saved or the pseudo high-resolution conversion table 113b in the ROM 113.

Since FIG. 9 shows a bit image which has undergone the 2×2 filter processing using the filter coefficients shown in FIG. 3A and therefore, the conditions are satisfied, the calculation processing of a maximum pixel value is executed. The calculation method is as follows. When the same pixel value appears in two successive pixels of a first pixel row in the window, and pixel values having the following ratio appear in two successive pixels at the same column positions as the former two successive pixels, of a second pixel row neighboring the first pixel row, a half of the sum of the pixel values of these four pixels is calculated as a maximum pixel value.

Pixel values of first pixel row pixel values of second pixel row $$=(F_{2\times 2}(0,0)+F_{2\times 2}(1,0)):(F_{2\times 2}(0,1)+F_{2\times 2}(1,1))$$

That is, since the ratio is 1:1, and pixels at pixel coordinates (1, 0) and (2, 0) in the window have a pixel value "a/2" in FIG. 9, a pixel array including these pixels is selected as the first pixel row. Since pixels at pixel coordinates (1, 1) and (2, 1) in the window have a pixel value "a/2", a pixel array including these pixels is selected as the second pixel row. Since the pixel values of the two pixels in the first pixel row and the pixel values of the two pixels in the second pixel row meet the relationship of the above ratio, a value "a" has been calculated as a half of the sum "2a" of the pixel values "a/2" of these four pixels and the calculated value "a" is determined as a maximum pixel value of the window shown in FIG. 9. In step S603 in FIG. 6, a background pixel value "0" and maximum pixel value "a" are output.

(Example of Matching-Patterns)

Matching-patterns used in the aforementioned pattern matching will be described below with reference to FIGS. 10, 11, 12, 13, 14 and 15. FIGS. 10, 11, 12, 13 and 14 respectively show examples of matching-patterns 1001, 1101, 1201, 1301 and 1401 and pixel replacing patterns 1002, 1102, 1202, 1302 and 1402 in this embodiment. These matching-patterns are assigned indices, and are prepared and managed in association with the pixel replacing patterns using a table shown in FIG. 15.

The matching-patterns 1001, 1101, 1201, 1301 and 1401 are given as a 5×5 matrix, and respective numerals in each matrix correspond to numerals of the following seven values.
  0: ignore
  1: background pixel
  2: half dot pixel
  3: maximum pixel
  4: other than background pixel
  5: other than half dot pixel
  6: other than maximum pixel The pixel replacing patterns 1002, 1102, 1202, 1302 and 1402 are given as a 2×2 matrix, and numerals in each matrix correspond to numerals of the following two values.
  0: background pixel value
  1: maximum pixel value (Sequence Example of Ternarization Processing S507)

Figure 16:
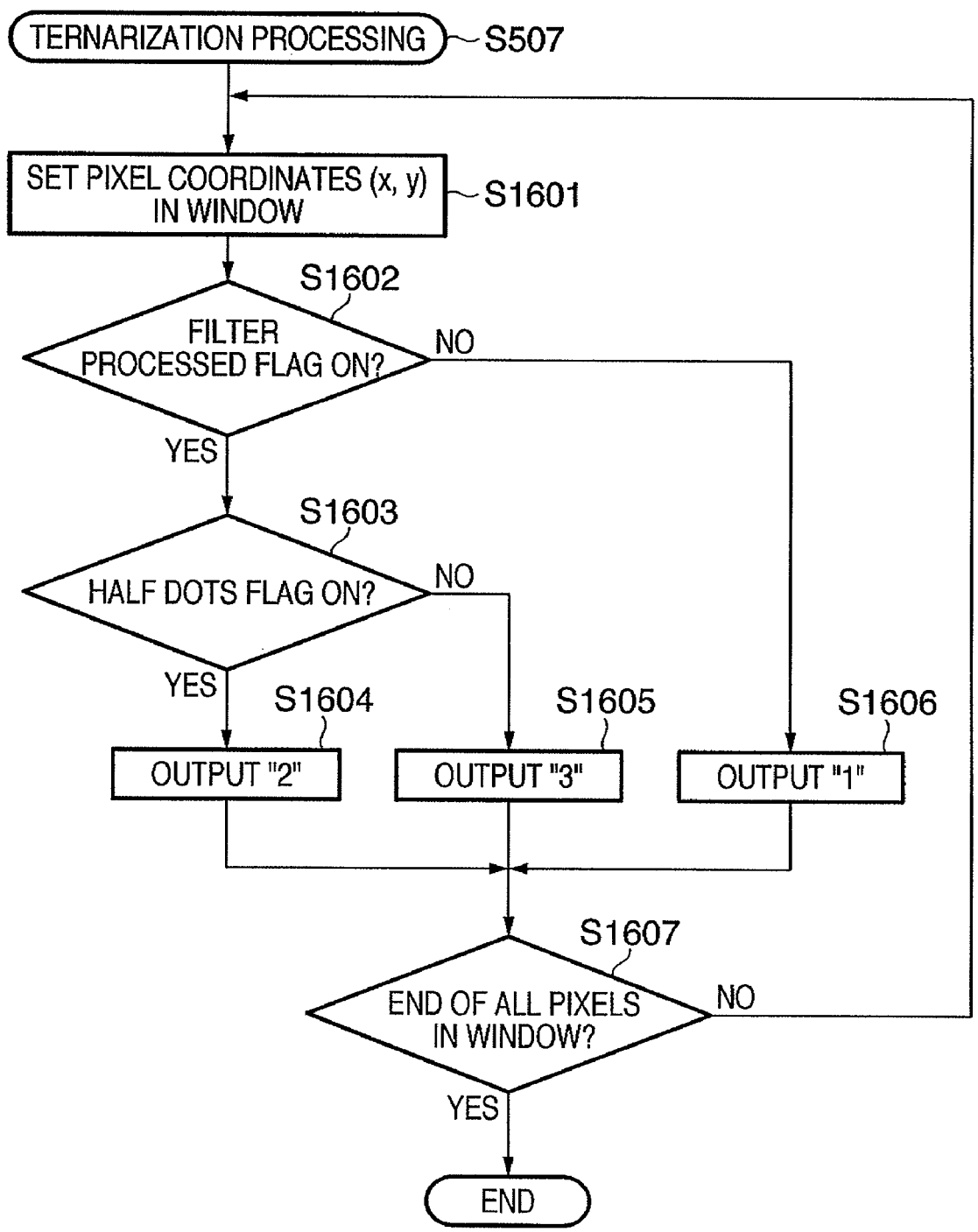
FIG. 16 is a flowchart showing ternarization processing executed by the high-resolution conversion processing unit according to the embodiment.

An example of the sequence of the ternarization processing will be described below with reference to the flowchart shown in FIG. 16.

The high-resolution conversion processing unit 111 sets a pixel value and attribute data at pixel coordinates (x, y) in the window (S1601). The high-resolution conversion processing unit 111 determines with reference to the set attribute data whether or not a filter processed flag is ON (S1602).

If the filter processed flag is ON, the high-resolution conversion processing unit 111 further determines with reference to the attribute data whether or not a half dots flag is ON (S1603). If the half dots flag is ON, the high-resolution conversion processing unit 111 outputs the pixel at the pixel coordinates (x, y) as "2: half dot pixel" (S1604). If the half dots flag is OFF, the high-resolution conversion processing unit 111 outputs the pixel at the pixel coordinates (x, y) as "3: maximum pixel" (S1605).

On the other hand, if the filter processed flag is OFF in step S1603, the high-resolution conversion processing unit 111 outputs the pixel at the pixel coordinates (x, y) as "1: background pixel" (S1606). The high-resolution conversion processing unit 111 applies the aforementioned processes to all pixels in the window (S1607).

(Practical Example of Ternarization Processing)

Practical examples of the ternarization processing applied to the windows shown in FIGS. 7 to 9 will be described below.

Figure 17:
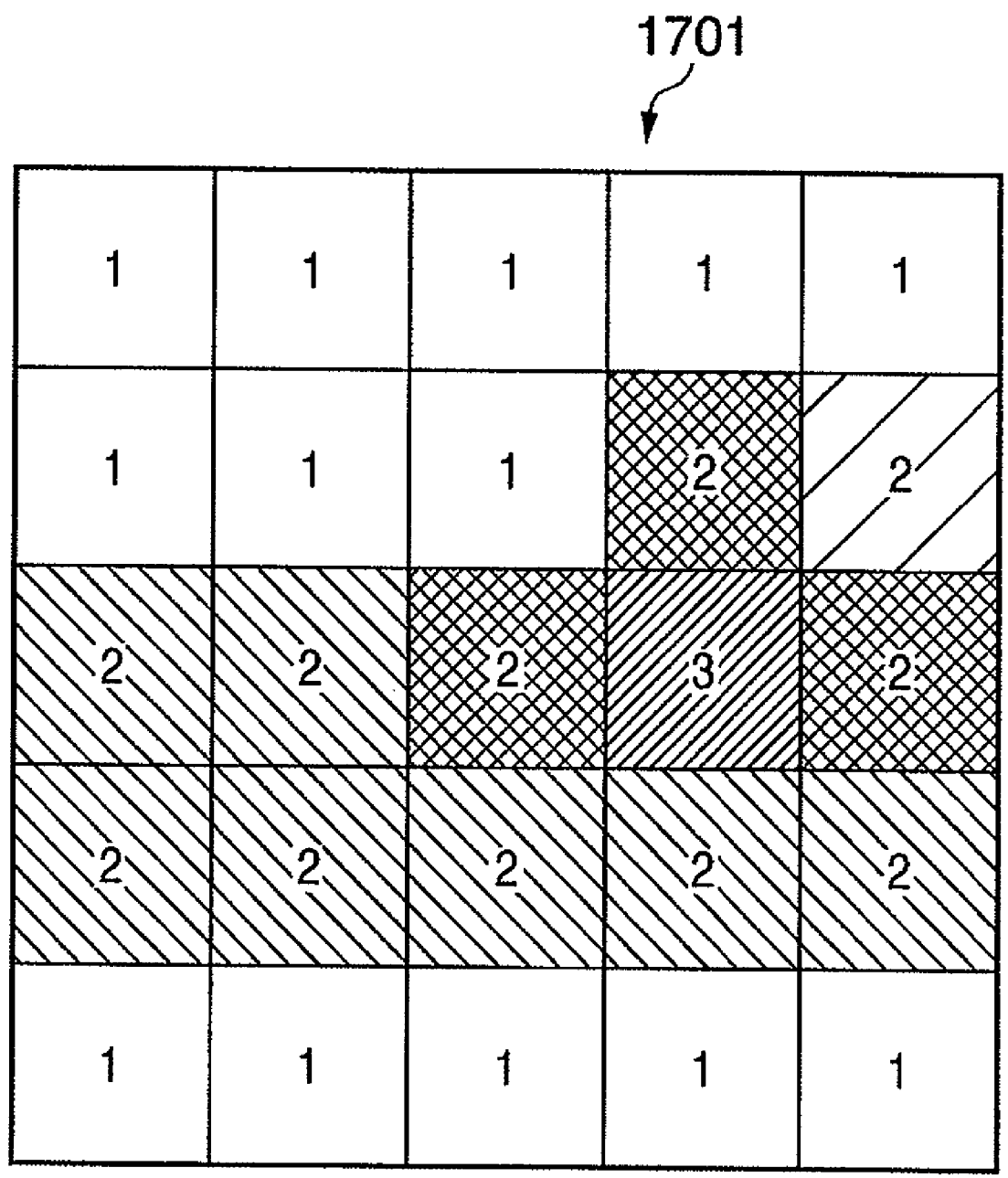
FIG. 17 shows an example of a window-pattern generated from the window shown in FIG. 7 by the ternarization processing executed by the high-resolution conversion processing unit.
Figure 18:
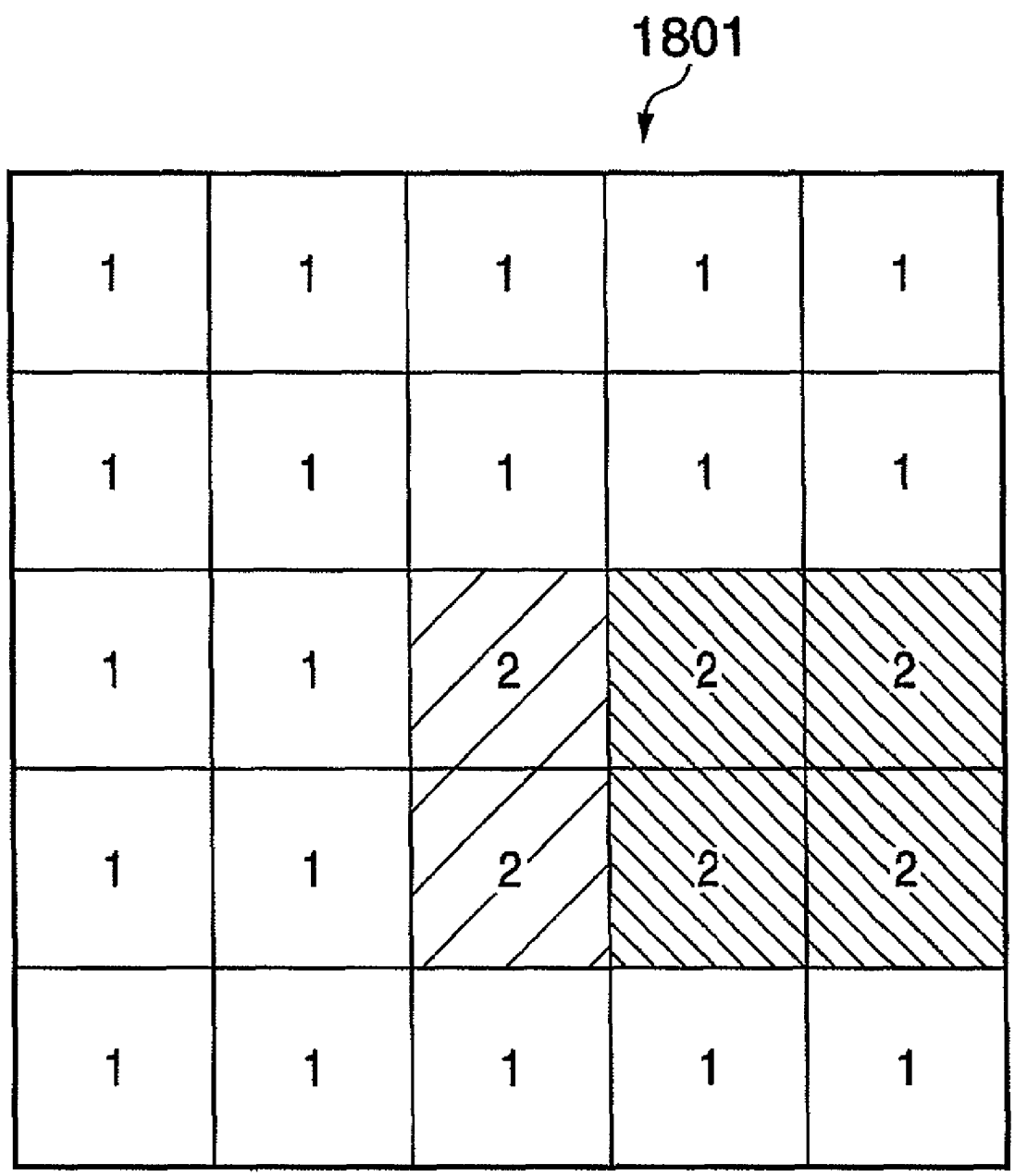
FIG. 18 shows an example of a window-pattern generated from the window shown in FIG. 8 by the ternarization processing executed by the high-resolution conversion processing unit.
Figure 19:
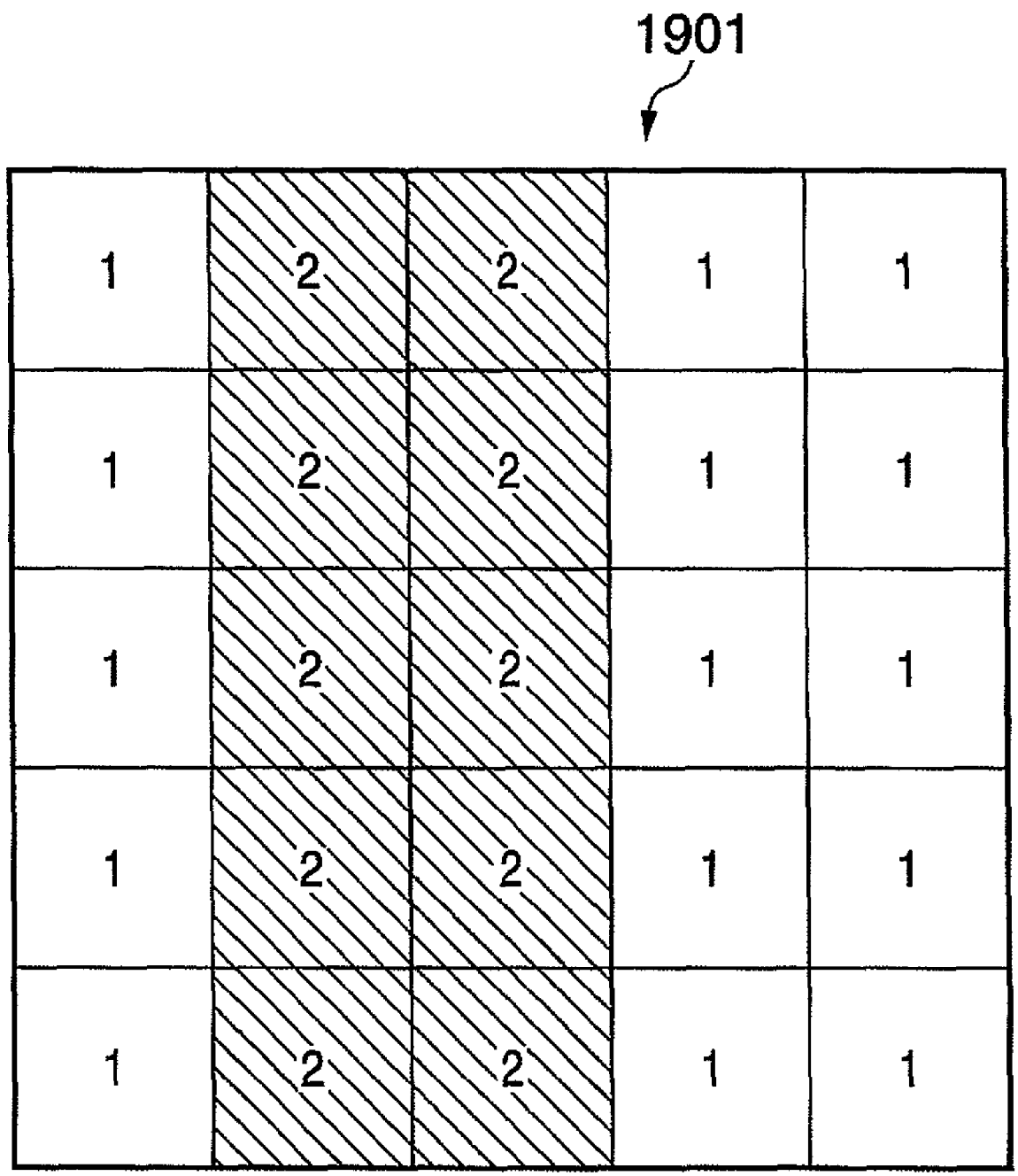
FIG. 19 shows an example of a window-pattern generated from the window shown in FIG. 9 by the ternarization processing executed by the high-resolution conversion processing unit.

FIG. 17 shows a window-pattern 1701 obtained by ternarizing the window shown in FIG. 7 by the ternarization processing. FIG. 18 shows a window-pattern 1801 obtained by ternarizing the window shown in FIG. 8 by the ternarization processing. FIG. 19 shows a window-pattern 1901 obtained by ternarizing the window shown in FIG. 9 by the ternarization processing. When the sequence of the ternarization processing is executed respectively for FIGS. 7, 8 and 9, the processing results shown in FIGS. 17, 18 and 19 are obtained.

That is, the black pixel 401, medium pixels 403, dark pixels 404, and white pixels 405 shown in FIG. 7 are respectively converted to "3", "2", "2", and "1", as shown in FIG. 17. Likewise, pixels in FIGS. 8 and 9 are respectively converted, as shown in FIGS. 18 and 19.

(Practical Example of Matching Processing S508)

The aforementioned matching processing will be described below with reference to FIGS. 17, 18, 19 and 20.

Figure 10:
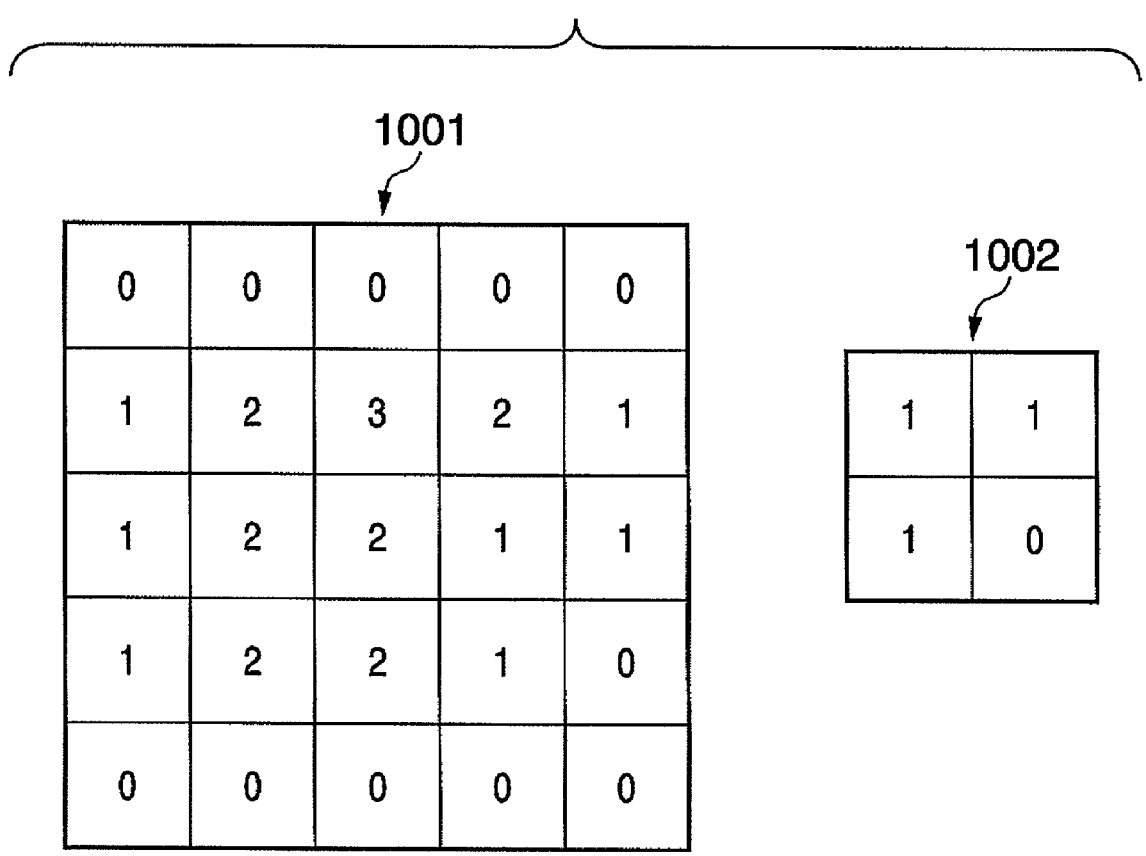
FIG. 10 shows an example of a matching-pattern and pixel replacing pattern used in the high-resolution conversion processing unit according to the first embodiment.
Figure 20:
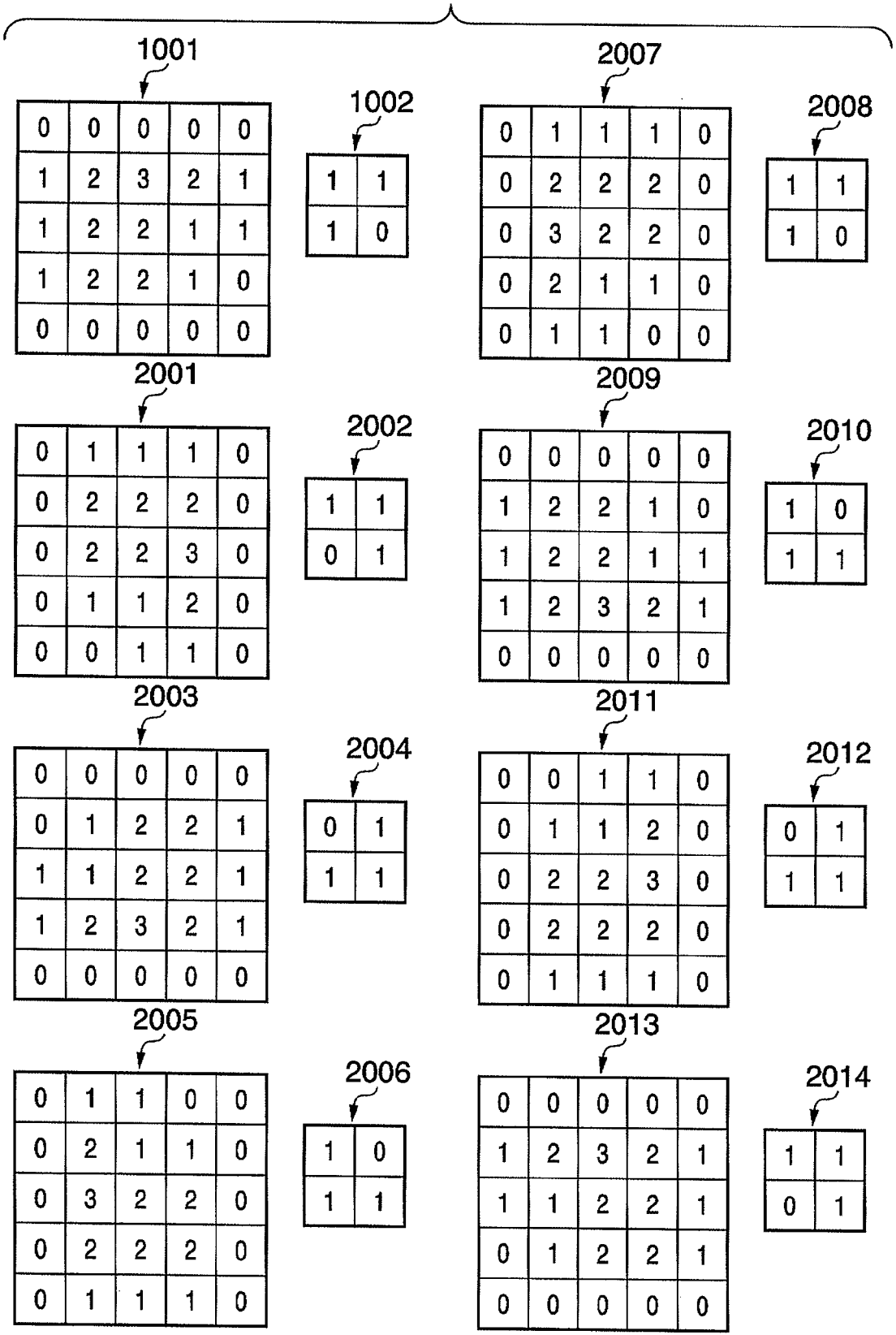
FIG. 20 shows examples of matching-patterns and pixel replacing patterns which have been rotated and transposed by matching processing executed by the high-resolution conversion processing unit according to the first embodiment.

FIG. 20 shows an example the matching-pattern and corresponding pixel replacing pattern shown in FIG. 10 (at the upper-left side in FIG. 20), matrices obtained by rotating the pixel replacing pattern (at the left side in FIG. 20) and matrices obtained by transposing the pixel replacing pattern (at the right side in FIG. 20). That is, a matching-pattern 2001 is obtained by rotating the matching-pattern 1001 clockwise by 90°, and a pixel replacing pattern 2002 is obtained by similarly rotating the pixel replacing pattern 1002. Also, a matching-pattern 2003 and pixel replacing pattern 2004 are obtained by rotating the matching-pattern 1001 and pixel replacing pattern 1002 by 180°, and a matching-pattern 2005 and pixel replacing pattern 2006 are obtained by rotating the matching-pattern 1001 and pixel replacing pattern 1002 by 270°. A matching-pattern 2007 is obtained by transposing the matching-pattern 1001, and a pixel replacing pattern 2008 is obtained by transposing the pixel replacing pattern 1002. Likewise, a matching-pattern 2009 and pixel replacing pattern 2010 are obtained by transposing the matching-pattern 2001 and pixel replacing pattern 2002, a matching-pattern 2011 and pixel replacing pattern 2012 are obtained by transposing the matching-pattern 2003 and pixel replacing pattern 2004, and a matching-pattern 2013 and pixel replacing pattern 2014 are obtained by transposing the matching-pattern 2005 and pixel replacing pattern 2006.

The matching is done in accordance with an output order of a plurality of pixels, which has been set in correspondence with pixel data of surrounding pixels of the pixel of interest, by rotating and transposing a matrix of each matching-pattern. A matrix of each pixel replacing pattern is similarly rotated and transposed. When the condition given by the values of the matrix of the matching-pattern matches values of the window that has undergone the ternarization processing through pattern matching, pixel replacement processing to be described later is executed using the pixel replacing pattern associated with the matched matching-pattern. This replacement processing corresponds to output pixel number replacement processing.

That is, since the window-pattern shown in FIG. 17 matches the matching-pattern 2011 through pattern matching, the pixel replacing pattern 2012 is used in the pixel replacement processing to be described later. Since the window-pattern shown in FIG. 18 matches the matching pattern 1101 in FIG. 11, the pixel replacing pattern 1102 is used in the pixel replacement processing to be described later. Since the window-pattern shown in FIG. 19 matches a pattern obtained by rotating the matching-pattern 1401 in FIG. 14 by 180°, a pixel replacing pattern obtained by rotating the pixel replacing pattern 1402 by 180° is used in the pixel replacement processing to be described later.

(Practical Example of Pixel Replacement Processing S510)

The aforementioned pixel replacement processing will be described below with reference to FIGS. 21, 22 and 23.

Figure 21:
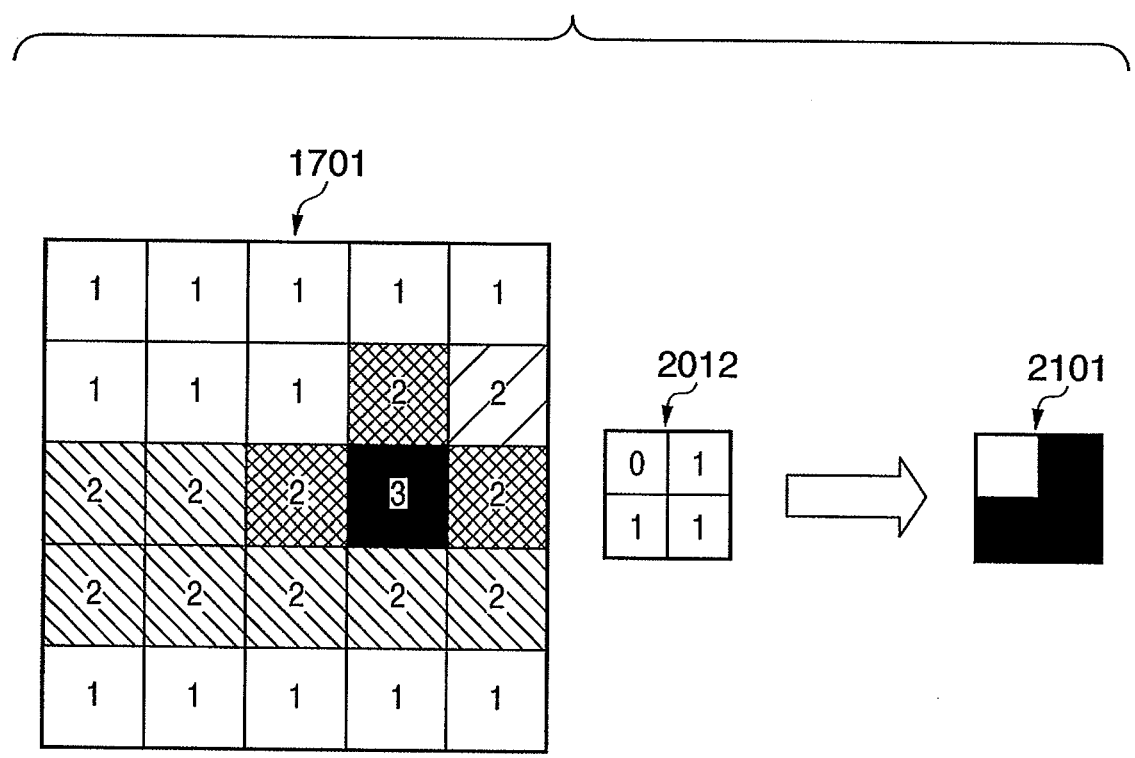
FIG. 21 shows an example of pixel replacement executed by the high-resolution conversion processing unit based on the window-pattern shown in FIG. 17 according to the first embodiment, and an example of a 1200 dpi bit image generated by the pixel replacement.

The left side of an arrow in FIG. 21 shows the ternarized window-pattern 1701 in FIG. 17, and the pixel replacing pattern 2012 associated with the matching-pattern in FIG. 20 that matches the window-pattern 1701 through pattern matching. The right side of the arrow in FIG. 21 shows 1200-dpi bitmap data 2101 of four pixels generated by the pixel replacement processing. Since the window-pattern 1701 has the background pixel value "0" and the maximum pixel value "a" by the background/maximum pixel value search processing, the bitmap data 2101 is generated by allocating pixels in a matrix in accordance with the values set in the matrix of the pixel replacing pattern 2012.

Figure 11:
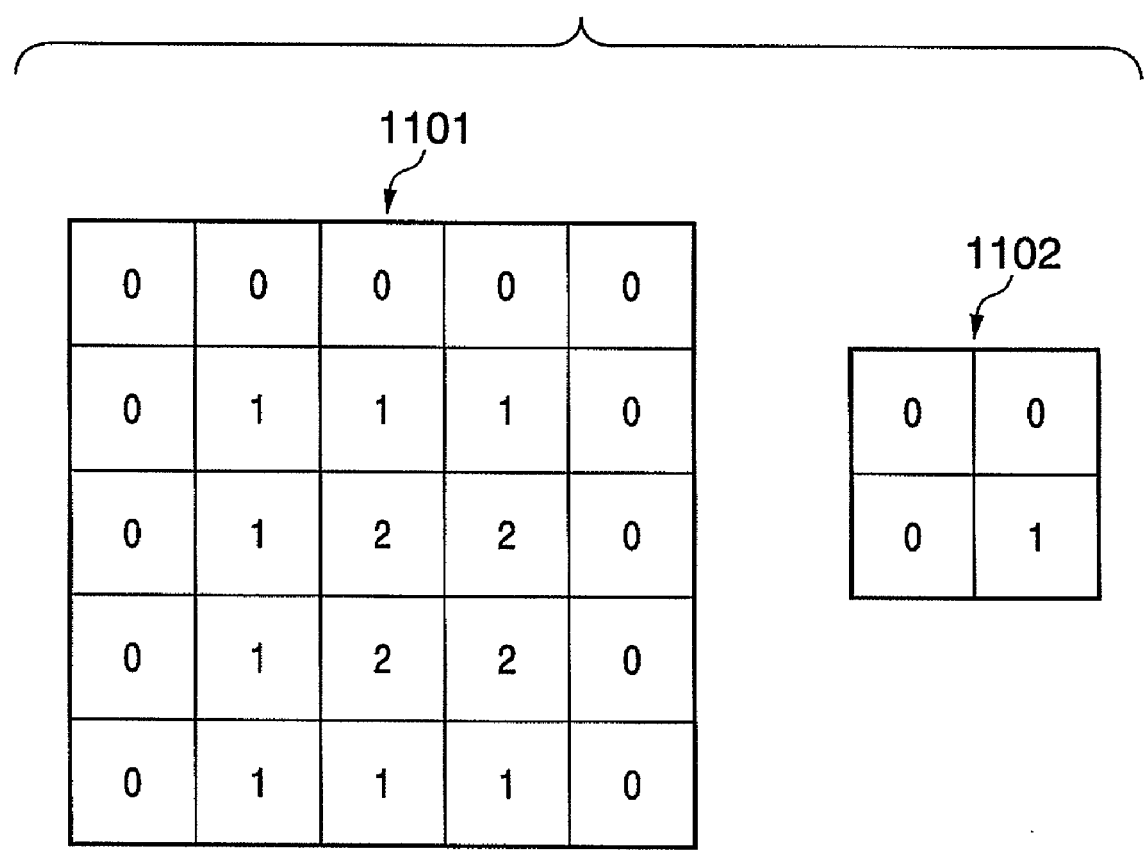
FIG. 11 shows an example of a matching-pattern and pixel replacing pattern used in the high-resolution conversion processing unit according to the first embodiment.
Figure 12:
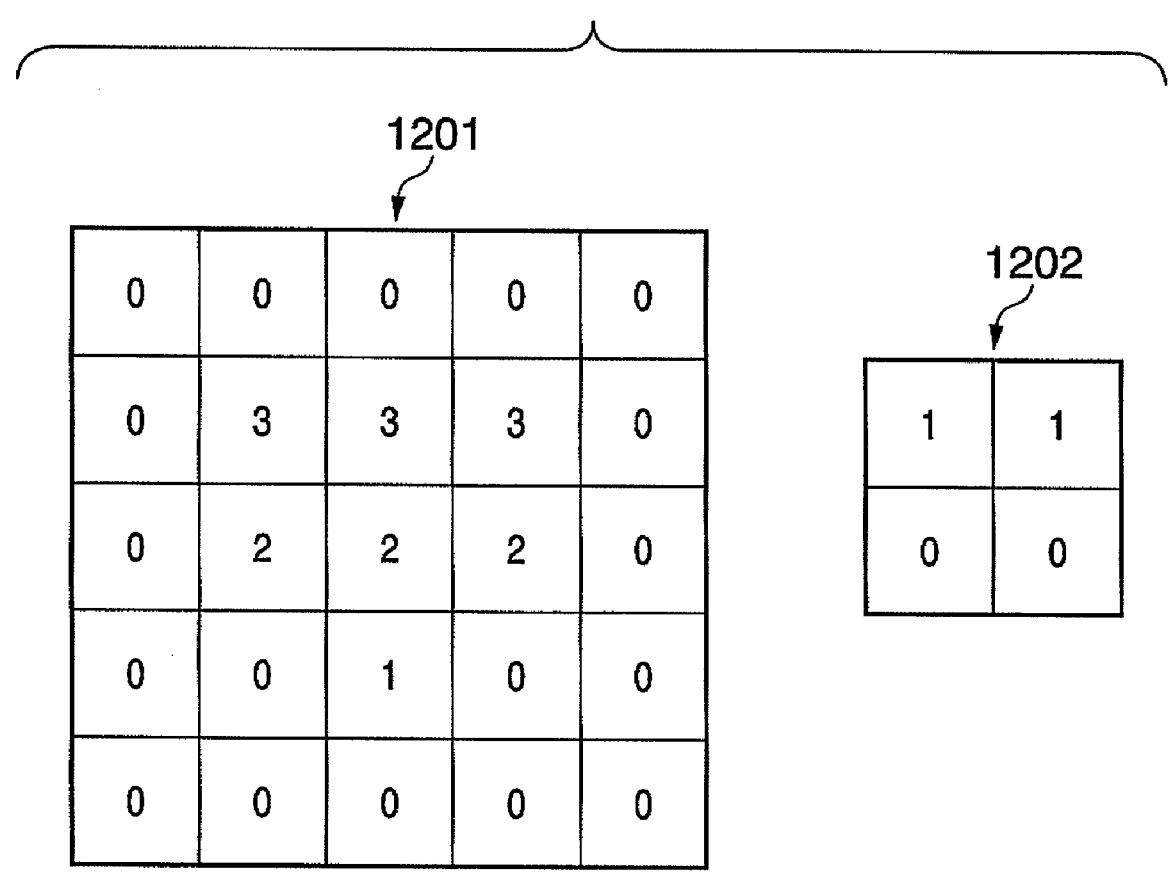
FIG. 12 shows an example of a matching-pattern and pixel replacing pattern used in the high-resolution conversion processing unit according to the first embodiment.
Figure 13:
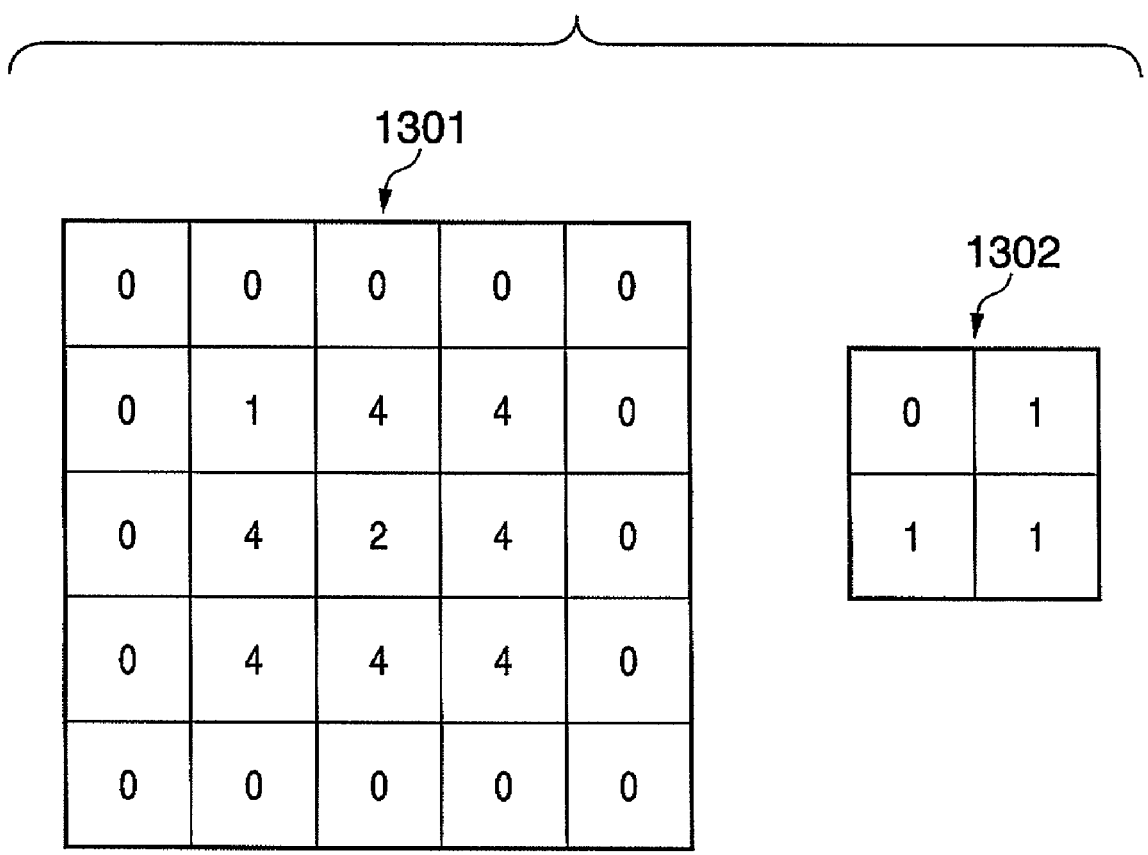
FIG. 13 shows an example of a matching-pattern and pixel replacing pattern used in the high-resolution conversion processing unit according to the first embodiment.
Figure 22:
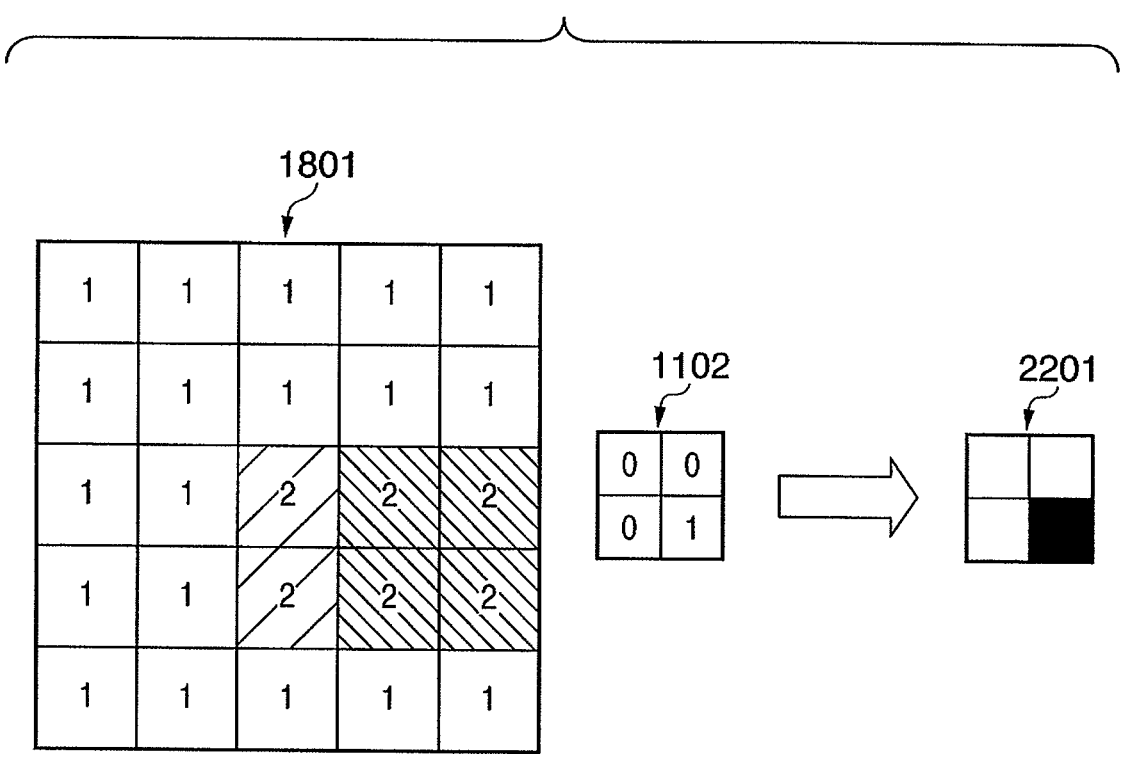
FIG. 22 shows an example of pixel replacement executed by the high-resolution conversion processing unit based on the window-pattern shown in FIG. 18 according to the first embodiment, and an example of a 1200 dpi bit image generated by the pixel replacement.

The left side of an arrow in FIG. 22 shows the ternarized window-pattern 1801 in FIG. 18, and the pixel replacing pattern 1102 associated with the matching-pattern in FIG. 11 that matches the window-pattern 1801 through pattern matching. The right side of the arrow in FIG. 22 shows 1200-dpi bitmap data 2201 of four pixels generated by the pixel replacement processing. Since the window-pattern 1801 has the background pixel value "0" and the maximum pixel value "a" by the background/maximum pixel value search processing, the bitmap data 2201 is generated by allocating pixels in a matrix in accordance with the values set in the matrix of the pixel replacing pattern 1102.

Figure 14:
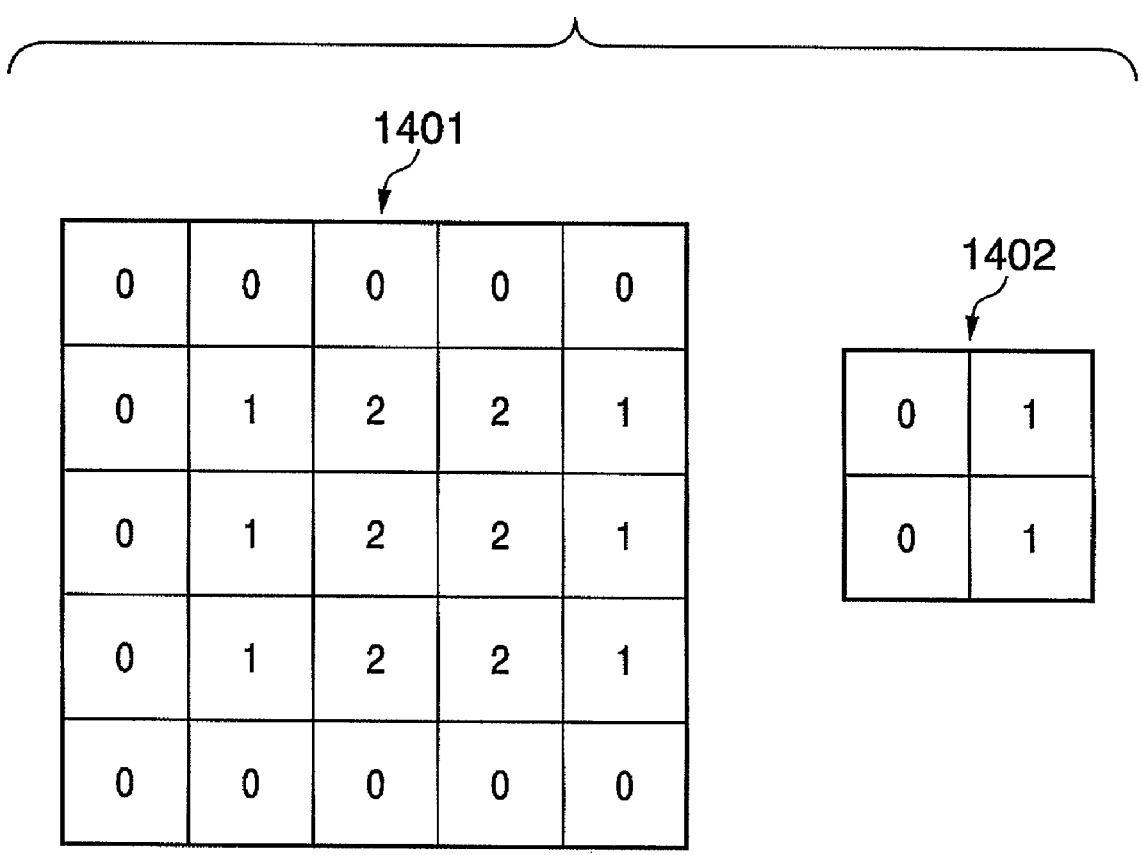
FIG. 14 shows an example of a matching-pattern and pixel replacing pattern used in the high-resolution conversion processing unit according to the first embodiment.
Figure 23:
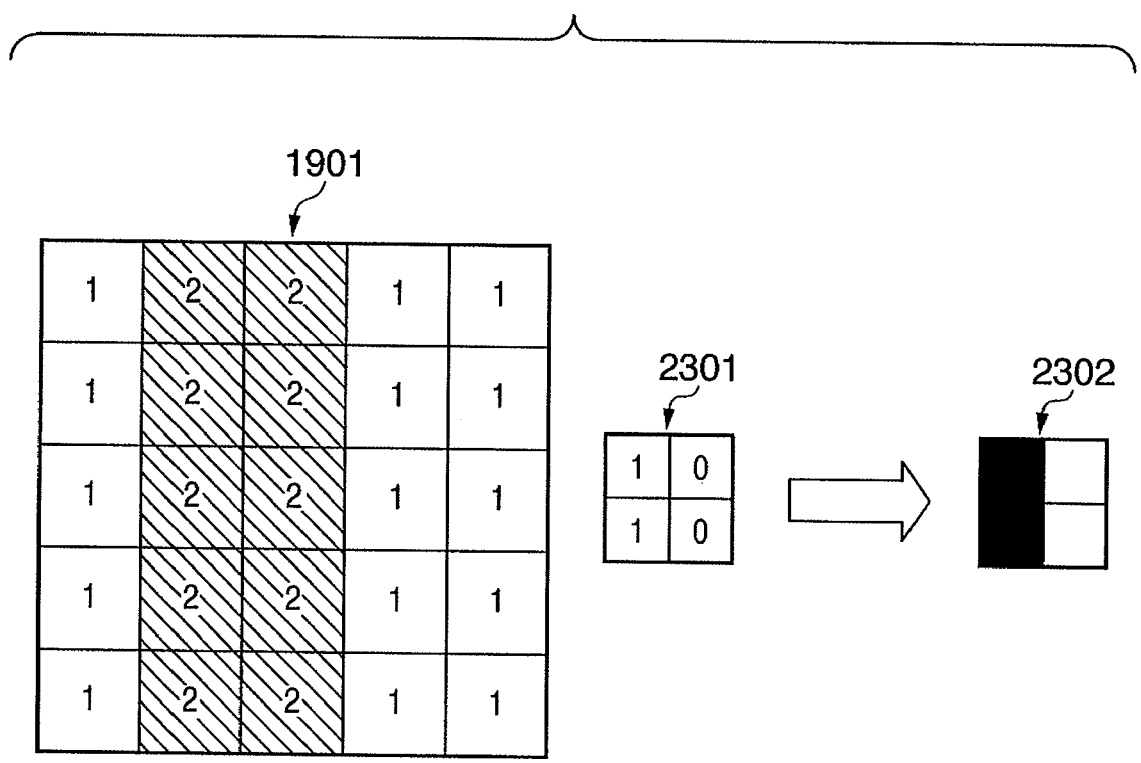
FIG. 23 shows an example of pixel replacement executed by the high-resolution conversion processing unit based on the window-pattern shown in FIG. 19 according to the first embodiment, and an example of a 1200 dpi bit image generated by the pixel replacement.

The left side of an arrow in FIG. 23 shows the ternarized window-pattern 1901 in FIG. 19, and a pixel replacing pattern 2301 obtained by rotating the pixel replacing pattern 1402 by 180° since the window-pattern 1901 matches the matching-pattern obtained by rotating the matching-pattern 1401 in FIG. 14 by 180° though pattern matching. The right side of the arrow in FIG. 23 shows 1200-dpi bitmap data 2302 of four pixels generated by the pixel replacement processing. Since the window-pattern 1901 has the background pixel value "0" and the maximum pixel value "a" by the background/maximum pixel value search processing, the bitmap data 2302 is generated by allocating pixels in a matrix in accordance with the values set in the matrix of the pixel replacing pattern 2301.

Effects of First Embodiment

As described above, the pseudo high-resolution conversion processing unit 108 converts a bit image rendered to 1200 dpi by the rendering unit 107 into a bit image of 600 dpi. The high-resolution conversion processing unit 111 applies the high-resolution conversion processing of the flowchart shown in FIG. 5 to one pixel in the bit image of 600 dpi to generate four pixels in a bit image of 1200 dpi without using any conventional spot-multiplexing. This high-resolution conversion processing can restore a pixel undergone the pseudo high-resolution conversion processing in a state close to the pixel before conversion. Since the conversion processing is done using a plurality of matching-patterns, the conversion processing is flexibly applied to small fonts and thin lines to restore them, that cannot be done in the conventional method. A high-resolution image can be stably reproduced without using any spot-multiplexing technique that makes the processes such as latent image formation unstable by pseudo high-resolution conversion.

<Arrangement and Operation Example of High-Resolution Conversion Processing Unit 111 of Second Embodiment>

An example of the arrangement and operation of the high-resolution conversion processing unit 111 according to this embodiment will be described in detail below with reference to the accompanying drawings.

Since the basic arrangement of the apparatus of this embodiment is the same as that in FIG. 1 used in the description of the first embodiment, a detailed description thereof will not be repeated. Since the pseudo high-resolution conversion processing executed by the pseudo high-resolution conversion processing unit 108 is the same as that in the first embodiment, a detailed description thereof will not be repeated.

An example of the processing sequence of the high-resolution conversion processing executed by the high-resolution conversion processing unit 111 of this embodiment will be described below with reference to the flowchart of FIG. 24.

The high-resolution conversion processing unit 111 receives the bit image with the resolution of 600 dpi and the attribute data, which have been read out from the hard disk 110 and decompressed by the aforementioned compression/decompression unit 109. The high-resolution conversion processing unit 111 delays the received data using line buffers for four lines, and then generates a window defined by 5×5 pixels having the center coordinates as a pixel of interest from the bit image in the line buffers (S2401).

The high-resolution conversion processing unit 111 determines whether or not the pixel of interest is generated by the filter processing, based on the attribute data corresponding to the pixel of interest at the center coordinates (S2402). If the high-resolution conversion processing unit 111 determines in step S2402 that the pixel of interest is generated by the filter processing, the high-resolution conversion processing unit 111 searches the window or line buffers for a background pixel value and a maximum pixel value in the background/maximum pixel value search processing to be described later (S2403). Since the background/maximum pixel value search processing is the same as that in the aforementioned first embodiment, a detailed description thereof will not be repeated.

The high-resolution conversion processing unit 111 then determines whether or not the pixel of interest is converted into a half dot by the filter processing based on the attribute data corresponding to the pixel of interest at the center coordinates, and whether or not the background pixel value and maximum pixel value have been able to be calculated in the above background/maximum pixel value search processing in step S2403 (S2404).

If the high-resolution conversion processing unit 111 determines in step S2404 that the pixel of interest is converted into a half dot, and the background pixel value and maximum pixel value have been calculated, the high-resolution conversion processing unit 111 calculates the number of output pixels to be described later (S2405).

The high-resolution conversion processing unit 111 checks indices of matching-patterns to be described later to determine the presence/absence of a matching-pattern for the next processing (S2406). If the processor 111 determines in step S2406 that a matching-pattern for the next processing is present, the high-resolution conversion processing unit 111 sets the matching-pattern and a corresponding pixel replacing pattern (S2407). The high-resolution conversion processing unit 111 applies the ternarization processing to respective pixels in the window generated in step S2401 based on the attribute data corresponding to the respective pixels in the window (S2408). Note that the ternarization processing is the same as that in the aforementioned first embodiment, and a detailed description thereof will not be repeated.

The high-resolution conversion processing unit 111 executes matching between a window-pattern of pixels ternarized by the ternarization processing (S2408) and the matching-pattern set in step S2407 (S2409). Since the matching is the same as the matching in the aforementioned first embodiment, a detailed description thereof will not be repeated.

The high-resolution conversion processing unit 111 determines whether or not the ternarized window-pattern has matched the set matching-pattern in the pattern matching in step S2409 (S2410). If the high-resolution conversion processing unit 111 determines that the window-pattern and matching-pattern have matched, the high-resolution conversion processing unit 111 executes pixel replacement processing (to be described later) in accordance with the pixel replacing pattern associated with the matching-pattern (S2411). If the window-pattern have not matched the matching-pattern in step S2410, the process returns to step S2406.

If the high-resolution conversion processing unit 111 determines in the aforementioned matching pattern determination processing (S2406) that the matching-processes using all matching-patterns have been complete, the high-resolution conversion processing unit 111 executes giving a order of output pixels (S2412: to be described later) to generate a pixel replacing pattern. The high-resolution conversion processing unit 111 executes the pixel replacement processing based on the generated pixel replacing pattern (S2411).

On the other hand, if the high-resolution conversion processing unit 111 determines in the aforementioned attribute determination processing (S2402) that the pixel of interest is not generated by the filter processing, that is, the pixel of interest is generated by the thinning processing of a pixel of interest or the replacement processing with a maximum pixel, the high-resolution conversion processing unit 111 executes the following processing. That is, the high-resolution conversion processing unit 111 replaces the pixel value of the pixel of interest with four pixel values to be output with maintaining the pixel values (S2413). Furthermore, if the high-resolution conversion processing unit 111 determines in the half dot determination processing (S2404) that the pixel of interest is not converted into a half dot or the background pixel value and maximum pixel value have not been calculated, the high-resolution conversion processing unit 111 similarly executes the pixel replacement processing in step S2413.

The high-resolution conversion processing 111 outputs the four pixel values generated in either step S2410 or S2411 as the pixel values of a 1200-dpi image corresponding to the pixel of interest of the 600-dpi image (S2414). The high-resolution conversion processing unit 111 determines the end of the line (S2415). If the end of the line buffer has been reached, the high-resolution conversion processing unit 111 ends the current processing, and waits for the processing of the next line. Otherwise, the process returns to step S2401 for the next pixel processing.

(Example of Output Pixel Number Calculation Processing S2405)

The aforementioned calculation processing of the number of output pixels in step S2405 will be described in detail below.

Figure 24:
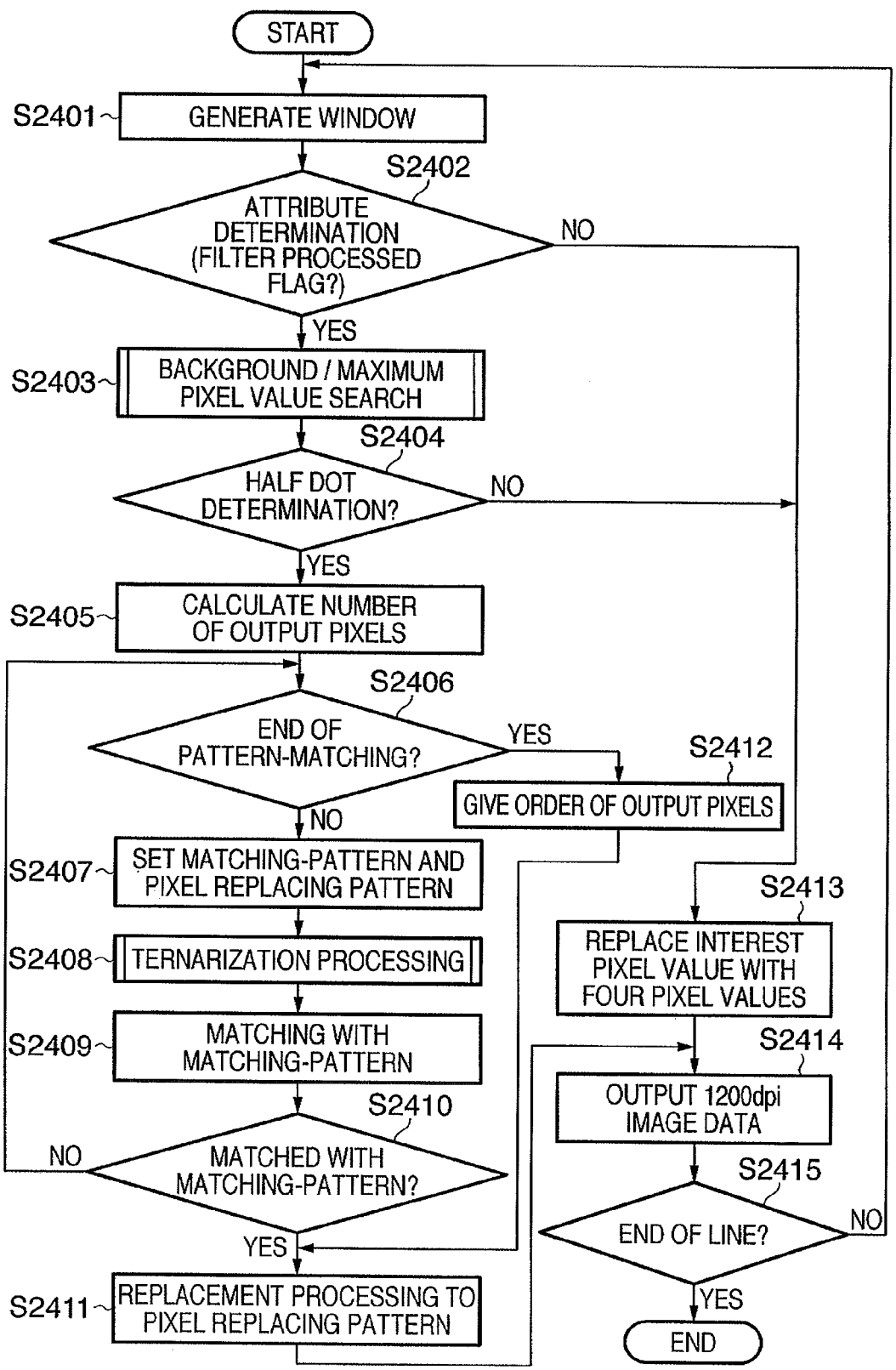
FIG. 24 is a flowchart showing the overall high-resolution conversion processing executed by the high-resolution conversion processing unit according to the second embodiment.

Four threshold values used to determine the numbers of pixels to be replaced are calculated based on the maximum pixel value and zero as a minimum pixel value found in step S2403 in FIG. 24, and the number of output pixels is calculated based on the calculated threshold values and the pixel of interest in the window.

An example of the threshold-value calculation method will be described below. Let TH1, TH2, TH3, and TH4 be four threshold values, and Dmax be the maximum pixel value. Then, the threshold values are calculated by:

$TH1 = Dmax/8$ $TH2 = (Dmax \times 3)/8$ $TH3 (Dmax \times 5)/8$ $TH4 = (Dmax \times 7)/8$ That is, if the maximum pixel value Dmax is 255, the threshold values TH1=31, TH2=96, TH3=159, and TH4=223 are calculated.

Let D be the pixel value of the pixel of interest value and N be the number of output pixels. Then, based on the threshold values calculated as described above, the number N of output pixels is calculated by:

```
if (D > TH4) N = 4:
  else if (D >TH3) N = 3;
    else if (D > TH3) N = 2;
      else if (D > TH1) N = 1;
        else N = 0;
```

(Practical Example of Output Pixel Number Calculation)

A practical example of the aforementioned calculation operation of the number of output pixels will be described below with taking FIGS. 7, 8 and 9 as examples.

In FIG. 7, the window is defined by the aforementioned pixel 401, pixels 403, pixels 404 and pixels 405, as described in the first embodiment.

Since the background pixel value "0" and maximum pixel value "a" are found in step S2403, the threshold values TH1=a/8, TH2=3a/8, TH3=5a/8, and TH4=7a/8 are calculated. Since the pixel value D of the pixel of interest in the window in FIG. 7 is D=3a/4, the number N of output pixels in case of FIG. 7 is N=3.

In FIG. 8, the window is defined by the aforementioned pixels 402, pixels 403 and pixels 405, as described in the first embodiment.

Since the background pixel value "0" and maximum pixel value "a" are found in step S2403, the threshold values TH1=a/8, TH2=3a/8, TH3=5a/8, and TH4=7a/8 are calculated. Since the pixel value D of the pixel of interest in the window in FIG. 8 is D a/4, the number N of output pixels in case of FIG. 8 is N=1.

In FIG. 9, the window is defined by the aforementioned pixels 403 and pixels 405, as described in the first embodiment.

Since the background pixel value "0" and maximum pixel value "a" are found in step S2403, the threshold values TH1=a/8, TH2=3a/8, TH3=5a/8, and TH4=7a/8 are calculated. Since the pixel value D of the pixel of interest in the window in FIG. 9 is D=a/2, the number N of output pixels in case of FIG. 9 is N=2.

In this embodiment, the four threshold values are calculated from the maximum pixel value in the calculation of the number of output pixels. However, predetermined values may be used for respective maximum pixel values without calculating these threshold values, and this embodiment is also effective in such case.

(Examples of Matching-Patterns)

The aforementioned matching-patterns will be described below with reference to FIGS. 25, 26, 27, 28 and 29.

FIGS. 25, 26, 27, 28 and 29 respectively show matching-patterns 2501, 2601, 2701, 2801 and 2901, and pixel replacing patterns 2502, 2602, 2702, 2802 and 2902 in this embodiment. These matching-patterns are assigned indices, and are prepared and managed in association with the pixel replacing patterns in the same manner as those in the first embodiment.

Since the matching-patterns 2501, 2601, 2701, 2801 and 2901 are the same as those in the first embodiment, a detailed description thereof will not be repeated.

The pixel replacing patterns 2502, 2602, 2702, 2802 and 2902 are given as a 2×2 matrix, and are given with a replacing order from 0 to 3 (0 is the top priority) corresponding to the positions of each matrix.

Note that the replacing order given to the pixel replacing pattern in this embodiment are not limited to 0 to 3, and this embodiment is effective as long as the replacing order corresponding to the positions of each matrix are identifiable.

(Practical Example of Pixel Replacement Processing S2411)

The aforementioned pixel replacement processing in step S2411 will be described below with reference to FIGS. 30, 31 and 32.

Figure 25:
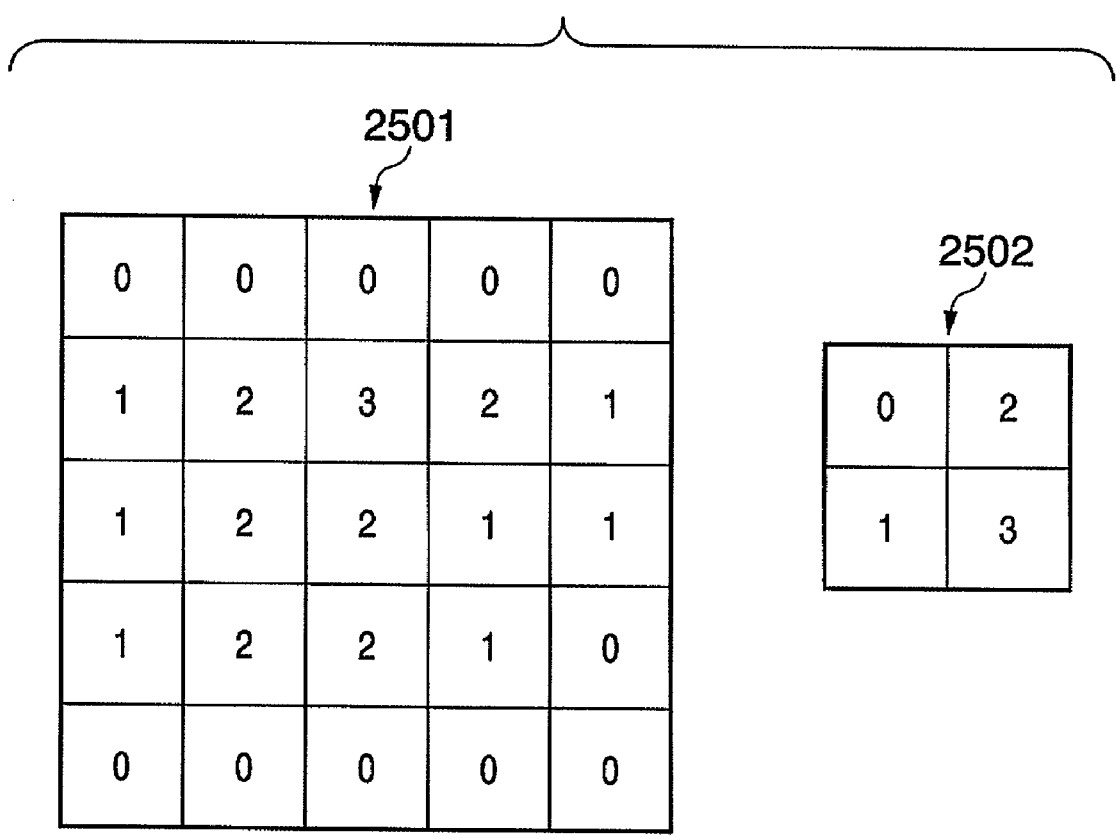
FIG. 25 shows an example of a matching-pattern and pixel replacing pattern used in the high-resolution conversion processing unit according to the second embodiment.
Figure 30:
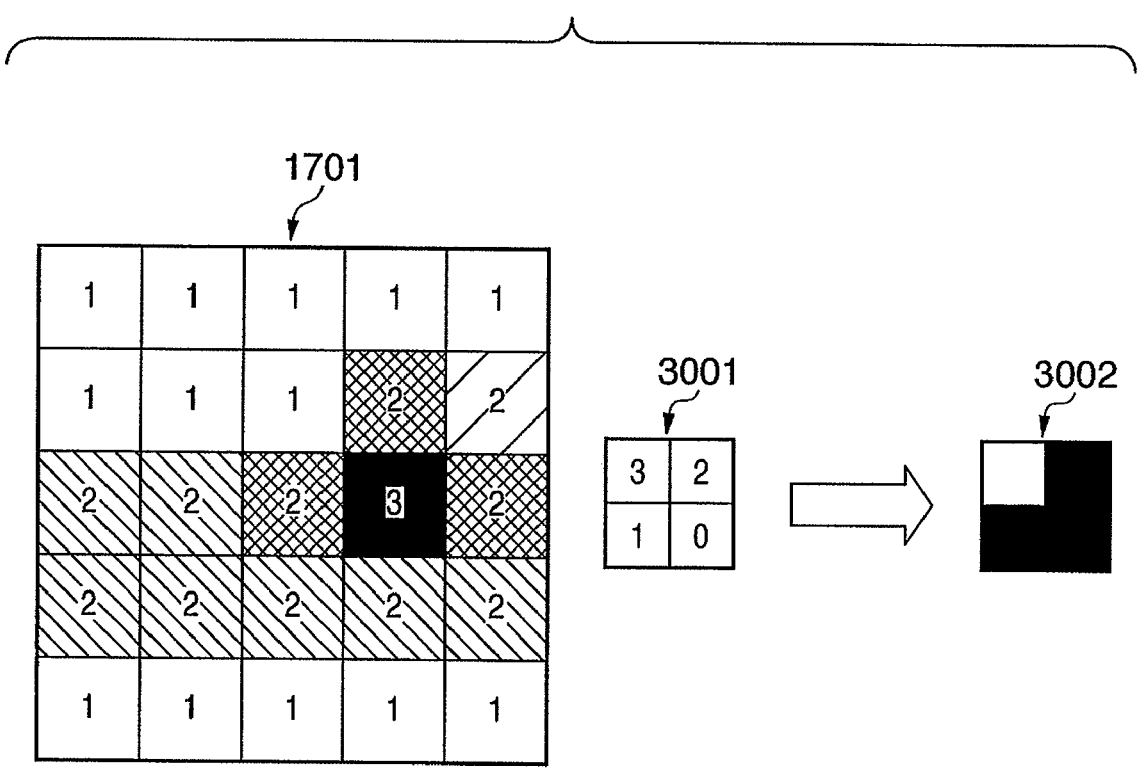
FIG. 30 shows an example of pixel replacement executed by the high-resolution conversion processing unit based on the window-pattern shown in FIG. 17 according to the second embodiment, and an example of a 1200 dpi bit image generated by the pixel replacement.

The left side of an arrow in FIG. 30 shows the ternarized window-pattern 1701 in FIG. 17, and a pixel replacing pattern 3001 obtained by rotating by 180° and transposing the pixel replacing pattern 2502 in FIG. 25, since the window-pattern 1701 matches a pattern obtained by rotating by 180° and transposing the matching-pattern 2501 in FIG. 25. The right side of the arrow in FIG. 30 shows 1200-dpi bitmap data 3002 of four pixels generated by the pixel replacement processing. Since the window-pattern 1701 has the background pixel value "0" and the maximum pixel value "a" by the background/maximum pixel value search processing in step S2403, the number of output pixels=3 is calculated in the calculation processing of the number of output pixels in step S2405. For this reason, the bitmap data 3002 is generated by allocating pixels in a matrix in accordance with the order set in the matrix of the pixel replacing pattern 3001.

Figure 26:
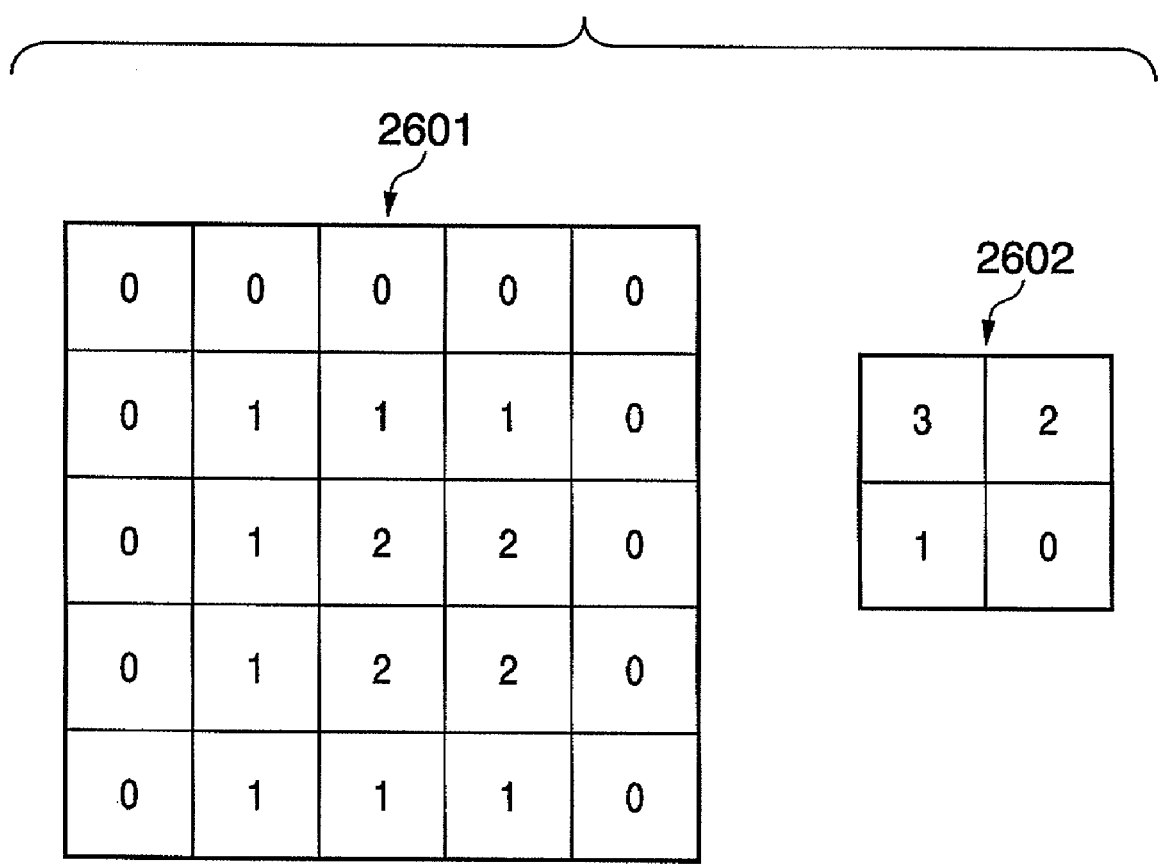
FIG. 26 shows an example of a matching-pattern and pixel replacing pattern used in the high-resolution conversion processing unit according to the second embodiment.
Figure 27:
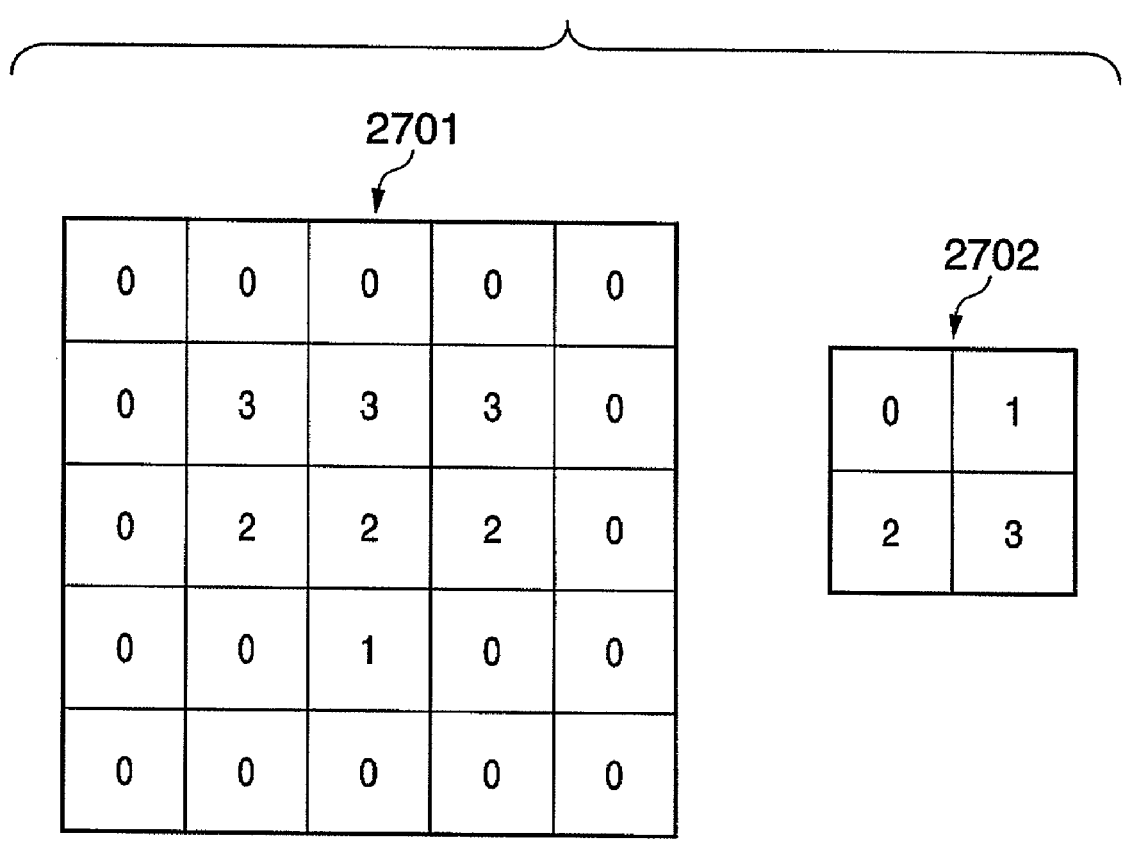
FIG. 27 shows an example of a matching-pattern and pixel replacing pattern used in the high-resolution conversion processing unit according to the second embodiment.
Figure 28:
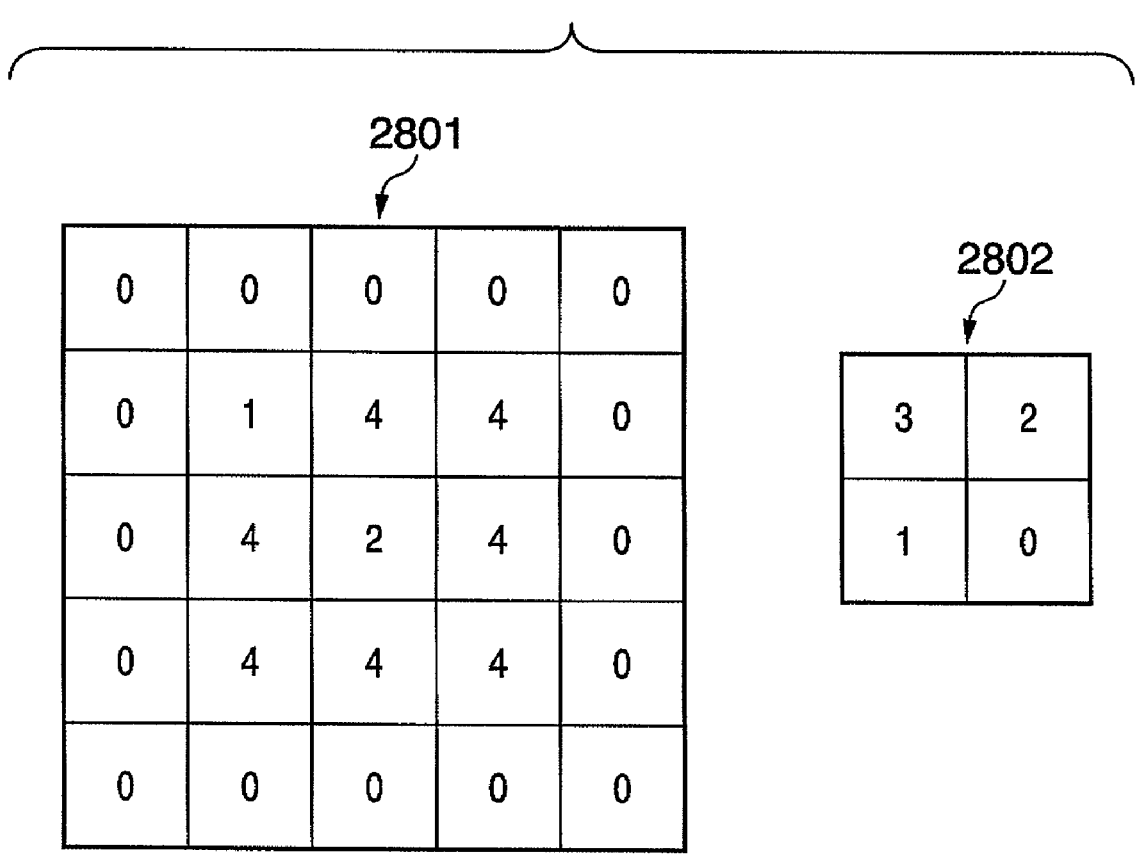
FIG. 28 shows an example of a matching-pattern and pixel replacing pattern used in the high-resolution conversion processing unit according to the second embodiment.
Figure 29:
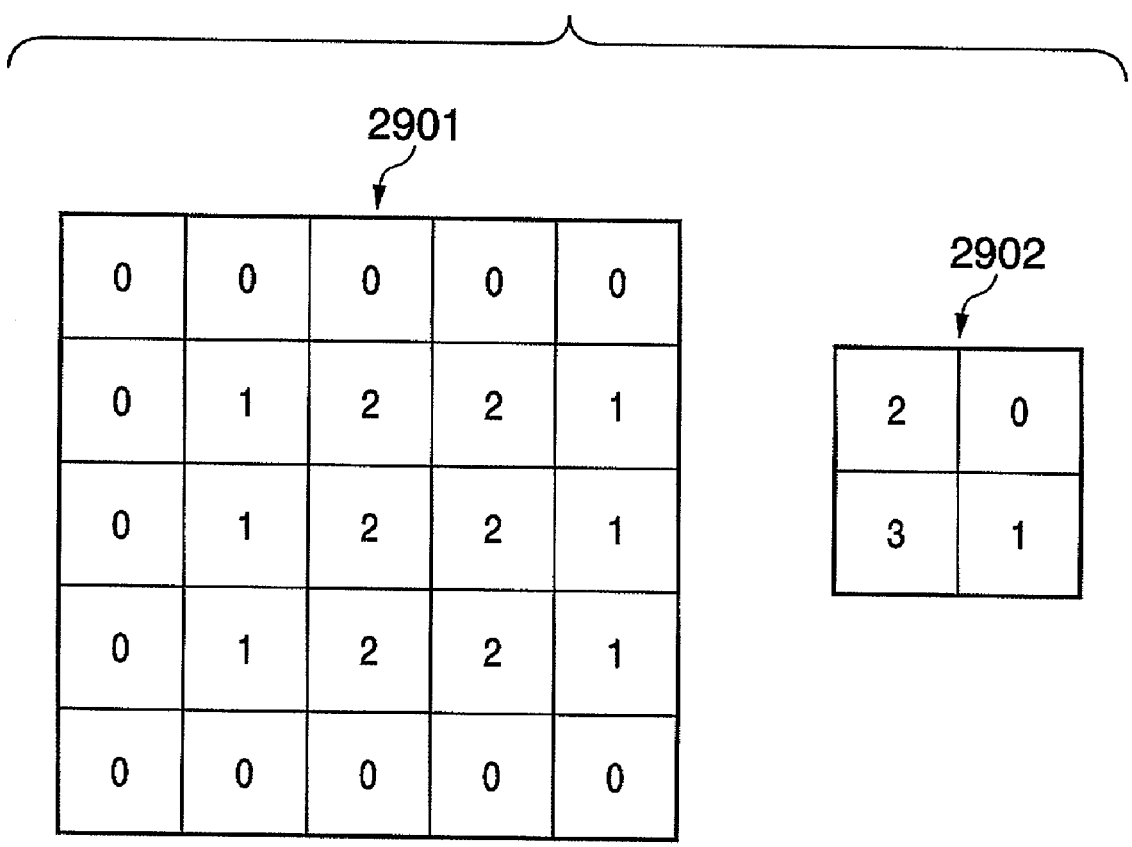
FIG. 29 shows an example of a matching-pattern and pixel replacing pattern used in the high-resolution conversion processing unit according to the second embodiment.
Figure 31:
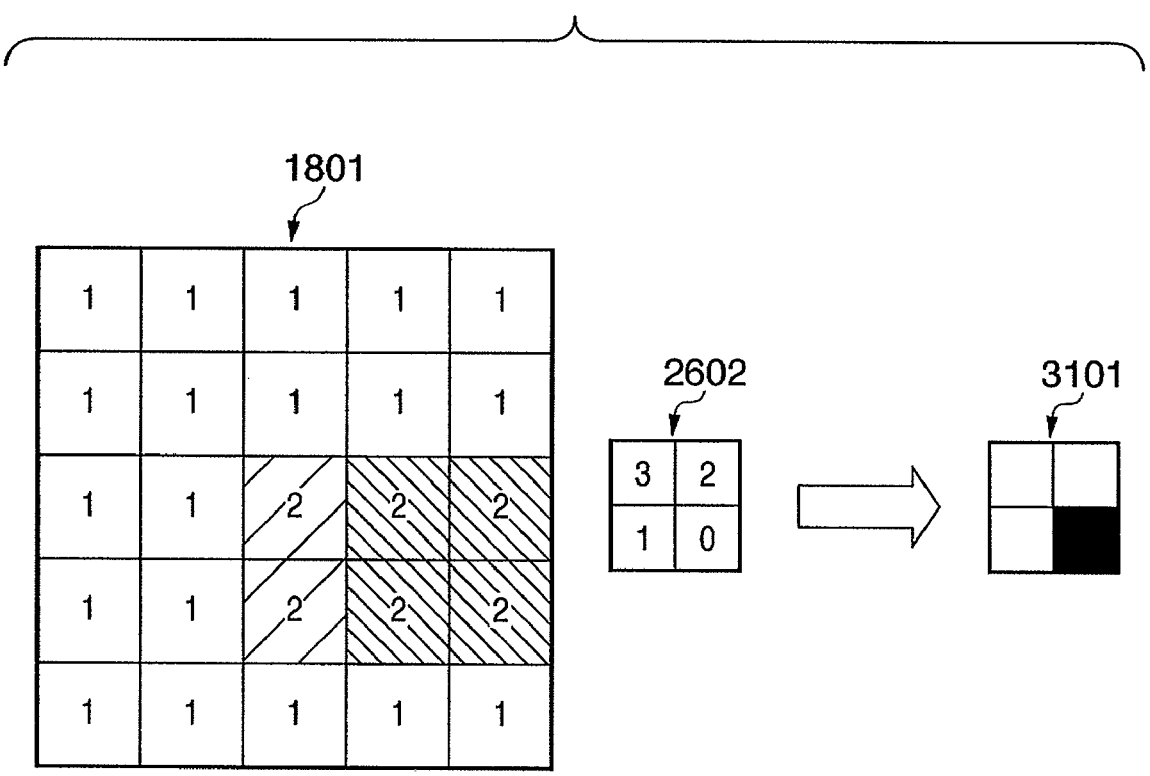
FIG. 31 shows an example of pixel replacement executed by the high-resolution conversion processing unit based on the window-pattern shown in FIG. 18 according to the second embodiment, and an example of a 1200 dpi bit image generated by the pixel replacement.

The left side of an arrow in FIG. 31 shows the ternarized window-pattern 1801 in FIG. 18, and the pixel replacing pattern 2602 associated with the matching-pattern 2601 in FIG. 26, since the window-pattern 1801 matches the matching-pattern 2601 in FIG. 26. The right side of the arrow in FIG. 31 shows 1200-dpi bitmap data 3101 of four pixels generated by the pixel replacement processing. Since the window-pattern 1801 has the background pixel value "0" and the maximum pixel value "a" by the background/maximum pixel value search processing in step S2403, the number of output pixels=1 is calculated in the calculation processing of the number of output pixels in step S2405. For this reason, the bitmap data 3101 is generated by allocating pixels in a matrix in accordance with the order set in the matrix of the pixel replacing pattern 2602.

Figure 32:
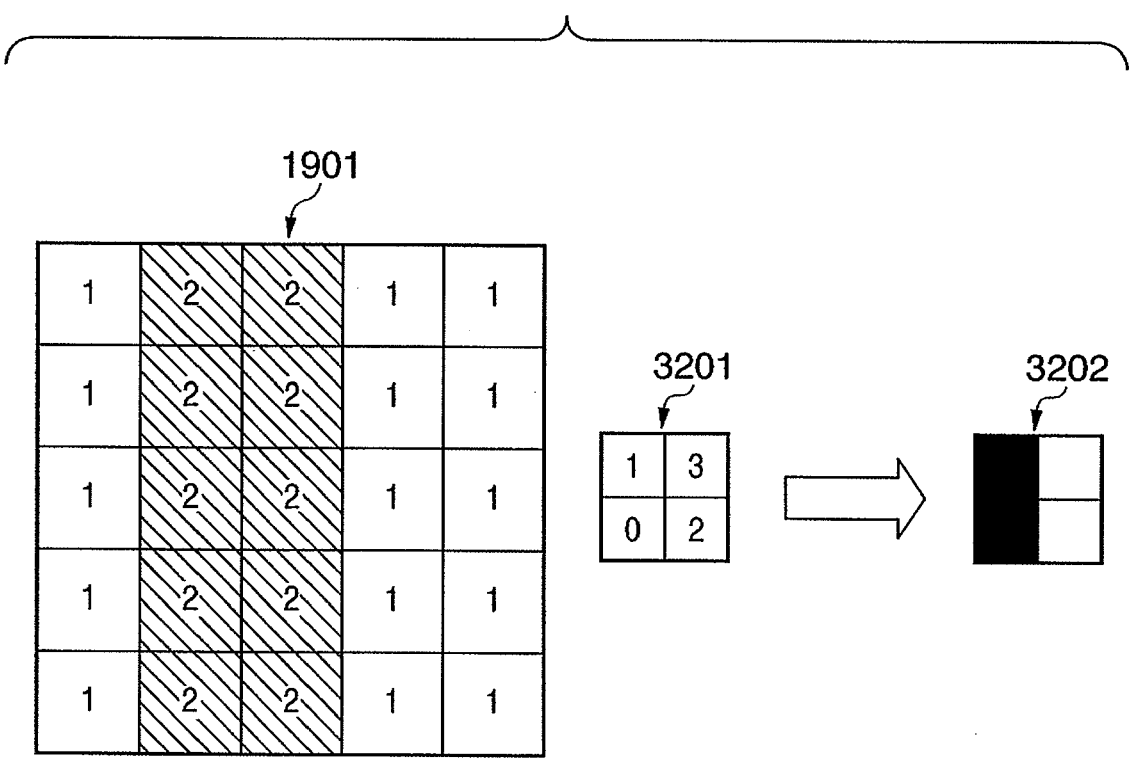
FIG. 32 shows an example of pixel replacement executed by the high-resolution conversion processing unit based on the window-pattern shown in FIG. 19 according to the second embodiment, and an example of a 1200 dpi bit image generated by the pixel replacement.

The left side of an arrow in FIG. 32 shows the ternarized window-pattern 1901 in FIG. 19, and a pixel replacing pattern 3201 which is rotated by 180°. In this example, since the window-pattern 1901 matches a pattern obtained by rotating the matching-pattern 2901 shown in FIG. 29 by 180°, the corresponding pixel replacing pattern 2902 is similarly rotated by 180°. The right side of the arrow in FIG. 32 shows 1200-dpi bitmap data 3202 of four pixels generated by the pixel replacement processing. Since the window-pattern 1901 has the background pixel value "0" and the maximum pixel value "a" by the background/maximum pixel value search processing in step S2403, the number of output pixels=2 is calculated in the calculation processing of the number of output pixels in step S2405. For this reason, the bitmap data 3201 is generated by allocating pixels in a matrix in accordance with the order set in the matrix of the pixel substitution pattern 3201.

(Example of Ranking of Output Pixels)

The aforementioned replacing order of output pixels will be described below with reference to FIGS. 33 and 34.

Figure 33:
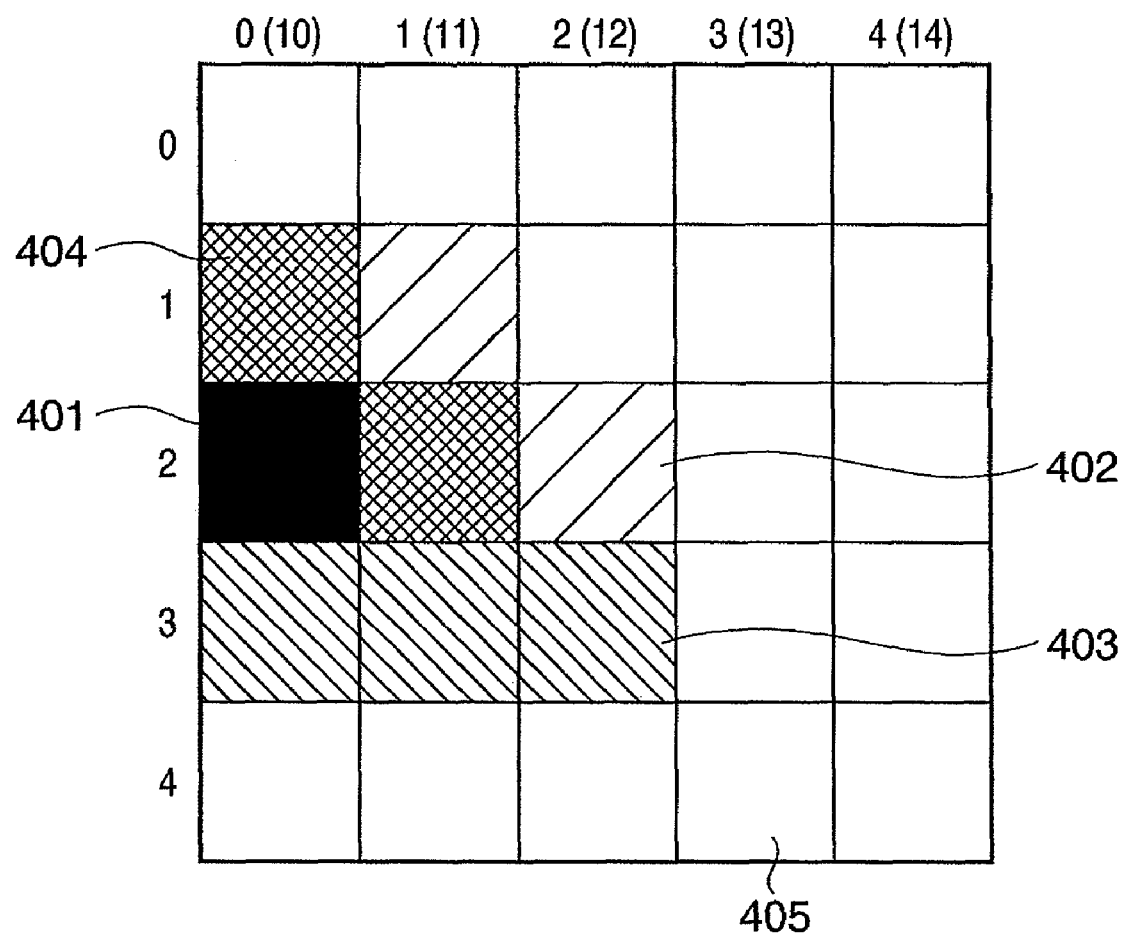
FIG. 33 shows an example of a window generated by the high-resolution conversion processing unit according to the embodiment.

FIG. 33 shows a window when a pixel at pixel coordinates (12, 2) is selected as a pixel of interest in the image shown in FIG. 4, which has been generated from the image in FIG. 2 by the pseudo high-resolution conversion processing. In FIG. 33, the window is defined by the aforementioned pixel 401, pixels 402, pixels 403, pixels 404, and pixels 405 described in the first embodiment. The window shown in FIG. 33 does not match any of the matching-patterns shown in FIGS. 25, 26, 27, 28 and 29 as examples of this embodiment. For this reason, in the ordering processing of output pixels in step S2412, the sum total of pixel values in each of the upper-left, upper-right, lower-right and lower-left portions in the window with the pixel of interest in the window as the center is calculated, and output pixels are ordered based on magnitudes of the calculated sum totals, thereby generating a pixel replacing pattern.

An example of the replacing order of output pixels in this embodiment will be described below.

Let $(i, j)$ be a certain pixel position in the window shown in FIG. 33, and $D(i, j)$ be the pixel value at that position. In this case, with respect to the pixel of interest in the window as the center, the upper-left sum total SUMupper-left, upper-right sum total SUMupper-right, lower-right sum total SUMlower-right, and lower-left sum total SUMlower-left are calculated by:

$$\text{SUMupper-left}=D(1,1)+D(2,1)+D(1,2)$$

$$\text{SUMupper-right}=D(2,1)+D(3,1)+D(3,2)$$

$$\text{SUMlower-right}=D(3,2)+D(2,3)+D(3,3)$$

$$\text{SUMlower-left}=D(1,2)+D(1,3)+D(2,3)$$

Therefore, in FIG. 33, SUMupper-left=5a/4, SUMupper-right=0, SUMlower-right=a/2, and SUMlower-left=2a are calculated.

Based on the sum totals calculated by the above equations, a replacing order is set at coordinates in a pixel replacing pattern in correspondence with the positions of sum totals in descending order of value, thereby generating a pixel replacing pattern. Hence, since SUMlower-left>SUMupper-left>SUMlower-right>SUMupper-right in FIG. 33, a pixel replacing pattern shown in FIG. 34 is generated.

The calculation method of the upper-left sum total SUMupper-left, upper-right sum total SUMupper-right, lower-right sum total SUMlower-right, and lower-left sum total SUMlower-left with the pixel of interest in the window as the center is an example. This embodiment is effective even when respective values are calculated irrespective of pixel positions in the window as long as output pixels can be ordered.

Since other arrangements, operations, and the like are the same as those in the first embodiment, a detailed description thereof will not be repeated.

Effects of Second Embodiment

As described above, according to this embodiment, the same effects as in the first embodiment can be obtained. In addition, although the processing volume increases compared to the method of the first embodiment, since a pixel replacing pattern for a pixel of interest can be calculated and such pixel of interest can be replaced with the pixel replacing pattern even if the matching has failed for the pixel of interest, the number of matching-patterns can be reduced. Since output pixel values are calculated based on the maximum pixel value and the pixel value of the pixel of interest, a pixel undergone the pseudo high-resolution conversion processing can be flexibly restored in a state close to the pixel before conversion.

<Arrangement and Operation Example of Pseudo High-Resolution Conversion Processing Unit 108 of Third Embodiment>

Since the basic arrangement of the apparatus of this embodiment is the same as that in FIG. 1 used in the description of the first embodiment, a detailed description thereof will not be repeated.

An example of the arrangement and operation of the pseudo high-resolution conversion processing unit 108 of this embodiment will be described in detail below.

In this embodiment, averaging processing to be described later is executed in addition to the thinning processing and replacement processing of the first embodiment.

(Example of Averaging Processing)

In the averaging processing, a pixel at coordinates in which two coordinate values are odd values in a 1200-dpi input image is set as a pixel of interest $D_{in}(i, j)$, and a sum total SUM of pixel values of pixels having the same attribute data as the attribute data of the pixel of interest of $D_{in}(i-1, j-1)$, $D_{in}(i, j-1)$ and $D_{in}(i, j)$ is calculated. Then, the number N of pixels is counted. The sum total SUM is divided by N to yield an output value corresponding to one pixel of 600 dpi. At this time, the number N is appended to the attribute data corresponding to the output pixel.

(Switching Example of Resolution Conversion)

The aforementioned processes are switched as needed based on the attribute flags in the attribute data corresponding to each pixel of the input image. An example of such switching processing will be described below.

When an image flag in attribute data corresponding to a pixel of interest or neighboring pixels is ON, or when there is no flag, the thinning processing of the pixel of interest is selected. When graphic flags of these pixels are ON, the replacement processing with a maximum pixel value is selected. In a case other than the above conditions, the averaging processing is executed according to the attribute data of the pixel of interest.

<Arrangement and Operation Example of High-Resolution Conversion Processing Unit 111 of Third Embodiment>

An example of the arrangement and operation of the high-resolution conversion processing unit 111 according to this embodiment will be described in detail below.

Since the high-resolution conversion processing of this embodiment is nearly the same as the processing of the second embodiment, only difference will be described in detail below.

In this embodiment, the determination processing in step S2402 in FIG. 24 is executed using the number N of pixels appended in the averaging processing in place of the filter processed flag. Also, in the background/maximum pixel value search processing in step S2403, only a background pixel value is searched since a maximum pixel value is not required. In step S2404, the half dot determination processing is done using the number N of pixels, and if N=1, 2 or 3, it is determined that the pixel of interest is a half dot. The calculation processing of the number of output pixels in step S2405 is skipped, and the number N of pixels appended to the attribute data in the pseudo high-resolution conversion processing is used as the number of output pixels. In the ternarization processing in step S2408, if the number N of pixels=4, "3: maximum pixel" is determined; if N=1, 2 or 3, "2: half dot pixel" is determined; otherwise, "1: background pixel" is determined. As a maximum pixel vale used in the replacement processing with a pixel replacing pattern in step S2411, the value of the pixel of interest averaged in the pseudo high-resolution conversion processing is used.

Effects of Third Embodiment

As described above, according to this embodiment, the same effects as in the second embodiment can be obtained. In addition, although the data size of the attribute data increases compared to the method of the second embodiment, the number of processing steps such as calculations of the number of substitution pixels can be greatly reduced.

Other Embodiments

In this embodiment, the number of bits of a bit image rendered by the rendering unit 107 is 8. However, the present invention is also effective even for other numbers of bits (for example, 10 bits) as long as the number of bits is sufficient to reproduce tones.

In this embodiment, the resolution of a bit image rendered by the rendering unit 107 is 1200 dpi, and the resolution of a bit image generated by the pseudo high-resolution conversion processing by the pseudo high-resolution conversion processing unit 108 is 600 dpi. However, the present invention is not limited to the above conditions. Assume that the resolution of a bit image generated by the rendering unit 107 is resolution A, and the resolution of a bit image generated by the pseudo high-resolution conversion processing unit 108 is resolution B. In this case, the present invention is effective as long as resolution A>resolution B, and the resolution A is an integer multiple n of the resolution B. In this case, the size of each pixel replacing pattern needs to be set as n×n.

In this embodiment, in the pseudo high-resolution conversion processing, if the image flag or graphic flag is ON based on the attribute flags, the thinning processing of the pixel of interest is selected. If the small font flag is ON, the replacement processing with a maximum pixel value is selected. In other cases, the filter processing is executed by selecting a filter with weighting coefficients according to the pixel value of the pixel of interest. However, the present invention is not limited to such combination. The present invention is effective even when various kinds of pseudo high-resolution conversion processing are switched and executed based on different combinations of attribute flags or different attribute flags.

The matching-patterns, pixel replacing patterns, and numerical values of the ternarization processing are not limited to those described above. The present invention is effective for any other combinations if they have the same roles.

In this embodiment, the five matching-patterns and five pixel replacing patterns are used. However, the number of patterns is not particularly limited, and the present invention is effective irrespective of the number of patterns.

In this embodiment, the window size in the high-resolution conversion processing is defined by 5×5 pixels. However, the present invention is effective even when the window size is larger or smaller than the window size in this embodiment. The number of lines of the line buffers and the size of each matching-pattern need to be changed according to the window size.

This embodiment describes software implementation of the image processing. However, the present invention is effective even when the image processing is implemented by a hardware component such as an SOC (system on chip), FPGA, or the like. Also, the present invention is effective when seamless operations such as matching and the like in the high resolution conversion processor may be pipelined.

The present invention may be applied to either a system constituted by a plurality of devices, or an apparatus consisting of a single device.

The objects of the present invention can also be achieved when a storage medium that records a program code of software that implements the functions of the aforementioned embodiments is supplied to a system or apparatus, and a computer (CPU or MPU) of that system or apparatus reads out and executes the program code stored in the storage medium.

In this case, the program code itself read out from the storage medium implements the functions of the above-mentioned embodiments, and the storage medium which records the program code constitutes the present invention.

As the storage medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer based on an instruction of the program code.

Furthermore, the program read out from the recording medium is written in a memory of an expansion board or a function expansion unit, which is inserted into or connected to the computer. After that, a CPU or the like equipped on that function expansion board or unit executes some or all of actual processes, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-082740, filed Mar. 27, 2007, which is hereby incorporated by reference herein in its entirety.

What is claimed is:

1. An image processing method of converting a multi-level image having a first resolution into a multi-level image having a second resolution lower than the first resolution and then restoring the multi-level image having the first resolution from the multi-level image having the second resolution, said method comprising the steps of:

in a resolution conversion from the multi-level image having the first resolution into the multi-level image having the second resolution, referring to an attribute flag indicating an attribute of a pixel before the resolution conversion;

determining whether or not the attribute flag is a font flag;

performing a filter processing to the pixel and holding a filter processed flag associated with the filter processed pixel if the attribute flag is determined to be the font flag, wherein the filter processed flag indicates that the filter processing has been performed; and holding a half dots flag associated with the filter processed pixel in a case where a pixel value of the filter processed pixel is smaller than a pixel value of the pixel before the filter processing is performed, wherein the half dots flag indicates a halftone; and in a restoration of the multi-level image having the first resolution from the multi-level image having the second resolution, replacing pixel data of the filter processed pixel with pixel data of a plurality of pixels, in correspondence with the filter processed flag and the half dots flag associated with the filter processed pixel and each pixel of pixels around the filter processed pixel.

2. The method according to claim 1, wherein a conversion processed flag includes the filter processed flag and the half dots flag.

3. The method according to claim 1, wherein the conversion from the multi-level image having the first resolution into the multi-level image having the second resolution includes the steps of:

applying the resolution conversion through the filter processing, except for a case in which an image flag as the attribute flag is ON, there is no attribute flag, or a graphic flag is ON;

converting a resolution through thinning processing, when the image flag as the attribute flag is ON or there is no attribute flag; and replacing pixel data of pixels of interest before the resolution conversion with a maximum pixel value of the pixels of interest, when the graphic flag is ON.

4. The method according to claim 1, wherein the restoration of the multi-level image having the first resolution from the multi-level image having the second resolution includes the steps of:

replacing the pixel data of the pixel of interest with pixel data of a first plurality of pixels associated with a pattern prepared in advance, when the filter processed flag and the half dots flag are ON, and a pattern of pixel data in a predetermined window including the pixel of interest matches the pattern prepared in advance; and replacing the pixel data of the pixel of interest with pixel data of a second plurality of pixels and maintaining a value of the pixel data of the pixel of interest, when the filter processed flag is OFF, the half dots flag is OFF, or the filter processed flag and the half dots flag are ON and the pattern of the pixel data in the predetermined window including the pixel of interest does not match the pattern prepared in advance.

5. The method according to claim 4, wherein the restoration of the multi-level image having the first resolution from the multi-level image having the second resolution further includes the steps of:

extracting a pixel value of a background region of an image and a maximum pixel value in the image based on the filter processed flag and the half dots flag, and converting the pixel data of the pixel of interest into a ternary value indicating the pixel value of the background region, the maximum pixel value in the image, or a pixel value of a half dot based on the filter processed flag and the half dots flag of the pixel of interest; and executing pattern matching between a window-pattern of the ternary values and the pattern prepared in advance.

6. The method according to claim 1, wherein the restoration of the multi-level image having the first resolution from the multi-level image having the second resolution includes the steps of:

calculating a number of output pixels to be output in correspondence with the pixel of interest;

replacing the pixel data of the pixel of interest with pixel data as many as the number of output pixels in correspondence with an output order of a first plurality of pixels associated with a pattern prepared in advance, when the filter processed flag and the half dots flag are ON, and a pattern of pixel data in a predetermined window including the pixel of interest matches the pattern prepared in advance;

setting an output order of a second plurality of pixels in correspondence with pixel data of pixels around the pixel of interest and replacing the pixel data of the pixel of interest with pixel data of as many as the number of output pixels in correspondence with the output order, when the filter processed flag and the half dots flag are ON, but the pattern of pixel data in the predetermined window including the pixel of interest does not match the pattern prepared in advance; and replacing the pixel data of the pixel of interest with pixel data of a third plurality of pixels and maintaining a value of the pixel data, when the filter processed flag is OFF or the half dots flag is OFF.

7. The method according to claim 6, wherein the number of output pixels is calculated by comparing the pixel data of the pixel of interest with a plurality of threshold values respectively assigned to a plurality of ranges which are obtained to divide a range from a maximum pixel value to a minimum pixel value into the plurality of ranges corresponding to a number of pixels replacing the pixel of interest.

8. The method according to claim 6, wherein the restoration of the multi-level image having the first resolution from the multi-level image having the second resolution further includes steps of:

extracting a pixel value of a background region of an image and a maximum pixel value in the image based on the filter processed flag and the half dots flag, and converting the pixel data of the pixel of interest into a ternary value indicating the pixel value of the background region, the maximum pixel value in the image, or a pixel value of a half dot based on the filter processed flag and the half dots flag of the pixel of interest; and executing pattern matching between a window-pattern of the ternary values and the pattern prepared in advance.

9. The method according to claim 1, wherein the first resolution is an integer multiple of the second resolution.

10. An image processing apparatus for converting a multi-level image having a first resolution into a multi-level image having a second resolution lower than the first resolution, and then restoring the multi-level image having the first resolution from the multi-level image having the second resolution, said apparatus comprising:

a resolution conversion unit constructed to, in a resolution conversion from the multi-level image having the first resolution into the multi-level image having the second resolution, refer to an attribute flag indicating an attribute of a pixel before the resolution conversion;

determine whether or not the attribute flag is a font flag;

perform a filter processing to the pixel and hold a filter processed flag associated with the filter processed pixel if the attribute flag is determined to be the font flag, wherein the filter processed flag indicates that the filter processing has been performed;

hold a half dots flag associated with the filter processed pixel in the case where a pixel value of the filter processed pixel is smaller than a pixel value of the pixel before the filter processing is performed, wherein the half dots flag indicates a halftone; and said apparatus further comprising:

a resolution restoration unit constructed to, in a restoration of the multi-level image having the first resolution from the multi-level image having the second resolution, replace pixel data of the filter processed pixel with pixel data of a plurality of pixels, in correspondence with the filter processed flag and the half dots flag associated with the filter processed pixel and each pixel of pixels around the filter processed pixel.

11. The apparatus according to claim 10, wherein a conversion processed flag includes the filter processed flag and the half dots flag.

12. The apparatus according to claim 10, wherein:

the filter processing unit is further constructed to apply the resolution conversion through the filter processing except for a case in which an image flag as the attribute flag is ON, there is no attribute flag, or a graphic flag is ON, and wherein the resolution conversion unit further comprises:

a thinning processing unit constructed to convert a resolution through thinning processing, when the image flag as the attribute flag is ON or there is no attribute flag; and a maximum pixel value replacement unit constructed to replace pixel data of pixels of interest before the resolution conversion with a maximum pixel value of the pixels of interest, when the graphic flag is ON.

13. The apparatus according to claim 10, wherein said resolution restoration unit comprises:

a pattern replacement unit constructed to replace the pixel data of the pixel of interest with pixel data of a first plurality of pixels associated with a pattern prepared in advance, when the filter processed flag and the half dots flag are ON, and a pattern of pixel data in a predetermined window including the pixel of interest matches the pattern prepared in advance; and a pixel data replacement unit constructed to replace the pixel data of the pixel of interest with pixel data of a second plurality of pixels and to maintain a value of the pixel data of the pixel of interest, when the filter processed flag is OFF, the half dots flag is OFF, or the filter processed flag and the half dots flag are ON and the pattern of the pixel data in the predetermined window including the pixel of interest does not match the pattern prepared in advance.

14. The apparatus according to claim 13, wherein said resolution restoration unit further comprises:
a ternarization unit constructed to extract a pixel value of a background region of an image and a maximum pixel value in the image based on the filter processed flag and the half dots flag, and to convert the pixel data of the pixel of interest into a ternary value indicating the pixel value of the background region, the maximum pixel value in the image, or a pixel value of a half dot based on the filter processed flag and the half dots flag of the pixel of interest; and
a pattern matching unit constructed to execute pattern matching between a window-pattern of the ternary values and the pattern prepared in advance.

15. The apparatus according to claim 10, wherein said resolution restoration unit comprises:
an output pixel number calculation unit constructed to calculate a number of output pixels to be output in correspondence with the pixel of interest;
a pattern order replacement unit constructed to replace the pixel data of the pixel of interest with pixel data as many as the number of output pixels in correspondence with an output order of a first plurality of pixels associated with a pattern prepared in advance, when the filter processed flag and the half dots flag are ON, and a pattern of pixel data in a predetermined window including the pixel of interest matches the pattern prepared in advance;
a setting order replacement unit constructed to set an output order of a second plurality of pixels in correspondence with pixel data of pixels around the pixel on interest, and to replace the pixel data of the pixel on interest with pixel data of as many as the number of output pixels in correspondence with the output order, when the filter processed flag and the half dots flag are ON, but the pattern of pixel data in a predetermined window including the pixel of interest does not match the pattern prepared in advance; and
a pixel data replacement unit constructed to replace the pixel data of the pixel on interest with pixel data of a third plurality of pixels with maintaining a value of the pixel data, when the filter processed flag is OFF or the half dots flag is OFF.

16. The apparatus according to claim 15, wherein the number of output pixels is calculated by comparing the pixel data of the pixel of interest with a plurality of threshold values respectively assigned to a plurality of ranges which are obtained to divide a range from a maximum pixel value to a minimum pixel value into the plurality of ranges corresponding to a number of pixels replacing the pixel of interest.

17. The apparatus according to claim 15, wherein said resolution restoration unit further comprises:
a ternarization unit constructed to extract a pixel value of a background region of an image and a maximum pixel value in the image based on the filter processed flag and the half dots flag, and to convert the pixel data of the pixel of interest into a ternary value indicating the pixel value of the background region, the maximum pixel value in the image, or a pixel value of a half dot based on the filter processed flag and the half dots flag of the pixel on interest; and
a pattern matching unit constructed to execute pattern matching between a window-pattern of the ternary values and the pattern prepared in advance.

18. The apparatus according to claim 10, wherein the first resolution is an integer multiple of the second resolution.

19. A non-transitory computer-readable storage medium storing a program for making a computer executing the steps of an image processing method according to claim 1.

20. An image processing method of converting an image having a first resolution into an image having a second resolution lower than the first resolution, said method comprising the steps of:
in a resolution conversion from the image having the first resolution into the image having the second resolution,
referring to an attribute flag indicating an attribute of a pixel before the resolution conversion,
determining whether or not the attribute flag is a font flag,
performing a filter processing to the pixel, and holding a filter processed flag associated with a filter processed pixel if the attribute flag is determined to be the font flag, wherein the filter processed flag indicates that the filter processing has been performed, and
holding a half dots flag associated with the filter processed pixel, in a case where a pixel value of the filter processed pixel is smaller than a pixel value of the pixel before the filter processing is performed, wherein the half dots flag indicates a halftone.

21. An image processing method of restoring an image having a first resolution from an image having a second resolution lower than the first resolution, said method comprising the steps of:
inputting the image having the second resolution, to a filter processed pixel of which a filter processed flag and a half dots flag are attached, wherein the filter processed flag indicates that a filter processing has been performed, and wherein the half dots flag indicates that a pixel value of the filter processed pixel is smaller than a pixel value of a pixel before the filter processing is performed to the filter processed pixel, and
in a restoration of the image having the first resolution from the image having the second resolution,
replacing pixel data of the filter processed pixel with pixel data of a plurality of pixels, in correspondence with the filter processed flag, the half dots flag, and each pixel of pixels around the filter processed pixel.

22. An image processing apparatus for converting an image having a first resolution into an image having a second resolution lower than the first resolution, said apparatus comprising:
a resolution conversion unit constructed to, in a resolution conversion from the image having the first resolution into the image having the second resolution,
refer to an attribute flag indicating an attribute of a pixel before the resolution conversion,
determine whether or not the attribute flag is a font flag,
perform a filter processing to the pixel, and holding a filter processed flag associated with a filter processed pixel if the attribute flag is determined to be the font flag, wherein the filter processed flag indicates that the filter processing has been performed, and
hold a half dots flag associated with the filter processed pixel, in a case where a pixel value of the filter processed pixel is smaller than a pixel value of the pixel before the filter processing is performed, wherein the half dots flag indicates a halftone.

23. An image processing apparatus for restoring an image having a first resolution from an image having a second resolution lower than the first resolution, said apparatus comprising:

an input unit constructed to input the image having the second resolution, to a filter processed pixel of which a filter processed flag and a half dots flag are attached, wherein the filter processed flag indicates that a filter processing has been performed, and wherein the half dots flag indicates that a pixel value of the filter processed pixel is smaller than a pixel value of a pixel before the filter processing is performed to the filter processed pixel; and a restoration unit constructed to, in a restoration of the image having the first resolution from the image having the second resolution,
replace pixel data of the filter processed pixel with pixel data of a plurality of pixels, in correspondence with the filter processed flag, the half dots flag, and each pixel of pixels around the filter processed pixel.

* * * * *